(12) United States Patent
Ehsaei et al.

(10) Patent No.: US 12,240,786 B2
(45) Date of Patent: Mar. 4, 2025

(54) INORGANIC MATERIAL WITH IMPROVED PROPERTIES

(71) Applicant: AGEMOS AG, Cham (CH)

(72) Inventors: Mohammad Hossein Ehsaei, Darmstadt (DE); Bernd Spangenberg, Offenburg (DE); Sidon Futterknecht, Cham (CH)

(73) Assignee: Agemos AG, Chem (CH)

( * ) Notice: Subject to any disclaimer, the term of this patent is extended or adjusted under 35 U.S.C. 154(b) by 339 days.

(21) Appl. No.: 17/629,003

(22) PCT Filed: Jul. 22, 2020

(86) PCT No.: PCT/EP2020/025341
§ 371 (c)(1),
(2) Date: Jan. 21, 2022

(87) PCT Pub. No.: WO2021/013383
PCT Pub. Date: Jan. 28, 2021

(65) Prior Publication Data
US 2022/0274878 A1 Sep. 1, 2022

(30) Foreign Application Priority Data
Jul. 23, 2019 (DE) .................... 10 2019 005 107.6

(51) Int. Cl.
*C04B 28/06* (2006.01)
*C04B 14/06* (2006.01)
(Continued)

(52) U.S. Cl.
CPC ............ *C04B 28/06* (2013.01); *C04B 14/06* (2013.01); *C04B 22/062* (2013.01);
(Continued)

(58) Field of Classification Search
CPC ....... C04B 28/06; C04B 14/06; C04B 22/062; C04B 22/165; C04B 24/42; C04B 28/26; C04B 40/0071; C04B 2111/00181; C04B 2111/00482; C04B 2111/00525; C04B 2111/00637; C04B 2111/00008; C04B 2111/00189; C04B 12/04; C04B 28/24; C04B 12/005; C04B 28/006; C04B 2201/20; C04B 2201/50; C04B 7/32;
(Continued)

(56) References Cited

U.S. PATENT DOCUMENTS

2020/0017410 A1* 1/2020 Turcinskas .............. C04B 24/10

OTHER PUBLICATIONS

Fernandez-Jimenez—PCT D2—sodium silicate calcium aluminate cement—J.Am.Ceram. Soc.—2011 (Year: 2011).*

(Continued)

*Primary Examiner* — Jennifer A Smith
*Assistant Examiner* — Jeffrey Eugene Barzach
(74) *Attorney, Agent, or Firm* — Dilworth & Barrese, LLP

(57) ABSTRACT

Suggested is a solid formed with Si, Al, Ca, O and at least one of Na and K, characterized in that in the $^{27}$Al-MAS-NMR spectra of the solid compared to the $^{27}$Al-MAS-NMR spectrum of calcium aluminate, an additional signal is present which has a chemical shift which lies between that of the main peak of calcium aluminate and that peak of calcium aluminate which is closest to the main peak in the higher field. 2.

4 Claims, 12 Drawing Sheets

(51) Int. Cl.
*C04B 22/06* (2006.01)
*C04B 22/16* (2006.01)
*C04B 24/42* (2006.01)
*C04B 28/26* (2006.01)
*C04B 40/00* (2006.01)
*C04B 111/00* (2006.01)

(52) U.S. Cl.
CPC ............ *C04B 22/165* (2013.01); *C04B 24/42* (2013.01); *C04B 28/26* (2013.01); *C04B 40/0071* (2013.01); *C04B 2111/00181* (2013.01); *C04B 2111/00482* (2013.01); *C04B 2111/00525* (2013.01); *C04B 2111/00637* (2013.01)

(58) Field of Classification Search
CPC .......... C04B 24/26; Y02P 40/10; Y02P 40/18; Y02W 30/91
See application file for complete search history.

(56) References Cited

OTHER PUBLICATIONS

Fernández-Jiménez, Ana, et al. "Effect of sodium silicate on calcium aluminate cement hydration in highly alkaline media: A microstructural characterization." Journal of the American Ceramic Society, vol. 94, No. 4, Jan. 14, 2011, pp. 1297-1303, https://doi.org/10.1111/j.1551-2916.2010.04242.x (Year: 2011).*

Yaseri, Sajad, et al. "The role of synthesis parameters on the workability, setting and strength properties of binary binder based geopolymer paste." Construction and Building Materials, vol. 157, Dec. 2017, pp. 534-545, https://doi.org/10.1016/j.conbuildmat.2017.09.102. (Year: 2017).*

Singh, Puyam S., et al. "Structural studies of geopolymers by 29SI and 27al MAS-NMR." Journal of Materials Science, vol. 40, No. 15, Aug. 2005, pp. 3951-3961, https://doi.org/10.1007/s10853-005-1915-x. (Year: 2005).*

Vafaei Mostafa et al., "Influence of calcium aluminate cement on geopolymerization of natural pozzolan," Construction and Building Materials, Elsevier, Netherlands, 114(1), 2016: 290-296.

Jiri Brus et al., "Advances in 27Al MAS NMR Studies of Geopolymers," Annual Reports on NMR Spectroscopy, GB, 88(1)m 2016: 79-147.

Mozcjawa W et al., "Spectroscopic studies of alkaline activated slag geopolymers," Journal of Molecular Structure, Elsevier, Amsterdam, NL, vol. 924-926, 2009: 434-441.

Ana Fernandez-Jimenez et al., "Effect of Sodium Silicate on Calcium Aluminate Cement Hydration in Highly Alkaline Media: A Microstructural Characterization," Journal of the American Ceramic Society, 94(4), 2011: 1297-1303.

Puyam S Singh et al., "Structural studies of geopolymers by 29Si and 27Al MAS-NMR"; Journal of Materials Science, Kluwer Academic Publishers, BO, 40(15), 2005: 1573-4803.

Medri V et al., "Role of the morphology and the dehydroxylation of metakaolins on geopolymerization," Applied Clay Science, Elsevier, Amsterdam, NL, 50(4), 2010: 538-545.

* cited by examiner

INORGANIC MATERIAL WITH IMPROVED PROPERTIES

FIELD

The present invention relates to that claimed above and thus relates to materials formed with Si, Al, Ca, O and at least one of Na and K.

BACKGROUND

Materials formed with Si, Al, Ca, O and at least one of Na and K are known.

Among them are the inorganic materials concrete and ceramics, which have a number of desirable properties, such as high strength and temperature resistance. Although in many cases the desirable positive properties are readily adjustable due to the long-standing use of the materials, both conventional concrete and conventional ceramics suffer from problems, especially but not only in terms of $CO_2$ emissions during production.

In this context, ceramic materials find a number of different applications. In addition to ceramics in the classic sense of sanitary ceramics; i.e., washbasins, bathtubs, shower trays, toilet bowls, tiles, etc., technical ceramics are now known to offer advantages due to their resistance to abrasion, high temperature, chemical attack, etc. In view of the wide range of applications, it is not surprising that although ceramics are sometimes defined as "inorganic, non-metallic, sparingly soluble in water and at least 30% crystalline", this definition is not universally accepted and is not used in this way in all areas of technology.

Nevertheless, what many of the above-mentioned ceramics have in common is that they are formed from a raw mass at room temperature and then acquire their desired typical material properties by heat treatment, usually at temperatures above 800° C. Occasionally, molding is carried out at room temperature. Occasionally, shaping takes place at even higher temperatures or even via melt flow with subsequent crystallization.

This means that the production of ceramics requires a high energy input, which is already critical and undesirable for climatic reasons, but also leads to high energy costs in production and, moreover, requires suitably large furnaces, especially for large-volume construction elements such as bathtubs and the like.

It would be desirable to provide alternatives for at least some of the applications mentioned, especially for those requiring particularly high energy consumption in production, whether because of the large mass of ceramics to be replaced, as in the case of large-volume sanitary ceramic elements, or because of their widespread use, or because of the special resistances required.

It is therefore desirable to have a substitute for at least some ceramic applications.

As far as concrete is concerned, it is a widely used building material that has been used for a large number of different applications for a long time. Here, the concrete and its properties vary according to the applications. For example, it may be necessary to use concrete that is particularly chemically stable, e.g. for port facilities exposed to seawater; concrete may be used in applications subject to particularly high dynamic alternating stresses, such as heavy-duty traffic lines, railroad ties, airport runways, etc.; strong bending and/or compressive stresses must be countered in prestressed bridge construction, high-rise building construction, etc. There may be applications where particularly high temperature strength is desired, such as so-called magma or volcanic concrete designed to retain heat from hot fluids, or where temperature strength must be provided for fire. Other applications require very low density concrete, such as foamed concrete. There is concrete that needs to cure faster or slower, flow farther or less before curing, etc.

Since it is possible to adapt concrete formulations on the basis of very long experience, concrete grades meet the respective requirements by modifying the constituents, selecting suitable additives such as superplasticizers, surfactants, etc. The concrete is therefore not always easy to produce. However, conventional concrete generally has in common that cement is used for its production. The German word cement goes back to the Latin term opus caementitium. The opus caementicium already contains burnt lime (usually "white lime" without clay-like constituents) and aggregates (quartz, graywacke, sandstone, tuff or brick fragments). Today, cement is still produced by burning, whereby the raw material of modern cement, which still consists mainly of natural raw materials, is ground and mixed in a dry process and then burned, for which continuous processes in rotary kilns are used today; the burned material is then cooled and ground again before it is used.

The use of such cement, however, now raises significant environmental concerns. According to the publication "Novel binders—The time after portland cement" by Horst-Michael Ludwig in: Betone der Zukunft, Herausforderungen und Chancen, 14. Symposium Baustoffe und Bauwerkserhaltung Karlsruher Institut für Technolo gie (KIT), Mar. 21, 2018", the huge quantities of cement consumed worldwide (2016: approx. 4 billion tons) and the large amount of energy required for its production mean that the cement industry is responsible for 5 to 8% of anthropogenic carbon dioxide emissions, even though traditional port land cement, which is particularly energy-intensive to produce, is no longer used in its pure form. The dimension of the problem becomes clear in the essay through a comparison with air traffic, which is so often in the headlines. According to this comparison, while at the time the paper was written all air traffic resulted in C02 emissions of about 700 million tons per year, emissions from the cement industry were well over 2 billion tons of CO2 per year.

It is therefore desirable to be able to specify cement-free concrete alternatives for at least some, preferably for many, and especially preferably for all concrete variants.

This is true despite the fact that for more than 20 years, global cement-related C02 emissions have been reduced through the use of so-called Portland composite cements. In this process, certain constituents such as granulated blast furnace slag and fly ash are used to produce cement of the CEM II group, i.e., cements containing granulated blast furnace slag and limestone powder. To date, CEM II cements containing fly ash have hardly been used in Germany. However, blast furnace slag cements of the CEM III class already play a major role and have doubled their market share in the last 10 years from around 10% to over 20%.

In addition, alternative binders are already being discussed by cement experts as alternatives to classic Portland cement in order to achieve further C02 savings. These include, for example—with the C02 savings potential indicated in parentheses—the following (A) Reactive Belite-rich Portland cement clinker (9%)
(B) Belite-ye'elimite-ferrite clinker (26%)
(C) Highly heated calcium silicate clinker (CCSC) (37%)
(D) Magnesium oxide, made from magnesium silicates (possibly up to 100%).

However, the savings potentials of options A-C are practically not convincing, whereas building materials based on option D are technically not yet sufficiently developed, see the paper "Alternative cement clinkers" by Ellis Gärtner and Tongbo Sui in Cement and Concrete Research 114 (2018) 27-39.

Therefore, neither Portland cement nor its above-mentioned alternative variants discussed by experts can achieve C02 neutrality by 2050.

Other alternatives have therefore already been discussed. Alkali-activated cements, so-called geopolymers, which can form Portland cement-like binders from fly ash or granulated blast furnace slag in combination with water glass, are increasingly being mentioned as a future cement alternative.

It is assumed that geopolymers form structures consisting of silicon and aluminum tetrahedra, whereby it is assumed that the geopolymerization reaction endothermically forms new, negatively charged Al(IV) centers (tetrahedrally coordinated), which are covalently bonded to Si centers via oxygen atoms. This can only be assumed, however, because no defined pure substances are used in geopolymer research, but kaolin, metakaolin, volcanic aluminum silicates, fly ashes and blast furnace slags. In [John L. Provis, Jannie S. J. van Deventer, Editors Alkali Activated Mate rials, Springer 2014, p. 95] it is pointed out that Al/Si ratios below 1 lead to unstable products and recommended to put the Si/Al ratio in the range 1-5 to obtain useful building materials.

An example of the use of geopolymers can be found in EP 3530631 A1, which discloses a geopolymer foam formulation for a noncombustible, sound absorbing, heat insulating geopolymer foam element, which is to comprise at least one anor ganic binder selected from the group consisting of latent hydraulic bin dem agents, pozzolanic binders, and mixtures thereof; at least one alkaline activator selected from the group consisting of alkali metal hydroxides, alkali metal carbonates, alkali metal aluminates, alkali metal silicates, and mixtures thereof; at least one surfactant selected from the group consisting of anionic surfactants, cati onic surfactants, nonionic surfactants, and mixtures thereof; a gas phase; and water. The alkaline activator is to be selected from alkali metal hydroxides of the formula MOH and alkali metal silicates of the formula m $SiO_2·_nM_2O$, where M is the alkali metal, preferably Li, Na, K and mixtures thereof, and the molar ratio m:n is <4.0, preferably less than or equal to 3.0, more preferably less than or equal to 2.0, in particular less than or equal to 1.70, and most preferably less than or equal to 1.20. It is stated that the setting behavior or setting time of a geopolymer foam formulation can be positively influenced by the addition of cement and that Portland cement, calcium aluminate cement and mixtures thereof are particularly suitable for this purpose; calcium aluminate cement with a light color is preferred. However, neither an example of a common mixture of calcium aluminate, water, alkali and water glass is described, and the calcium aluminate content is to be limited to 1-20% by weight. A ratio of silicon to aluminum atoms (Si/Al ratio) is also specified, which should be between 10:1 and 1:1.

Reference is also made to WO 2010 121886 A1, which describes an allegedly low-shrinkage binder system in which a mixture is to comprise alkali-activatable aluminosilicate binders (by aluminosilicate is probably meant "aluminum silicate") and, furthermore, vegetable fats and/or oils for shrinkage reduction and for hydrophobization in alkali-activatable aluminosilicate binders. Also described are grouts, leveling compounds or coatings containing the specified mixture. As alkali-activatable aluminosilicate binders. These are inorganic binder systems based on reactive water-insoluble oxides based on, among others, silicon dioxide in combination with aluminum oxide. The reactive oxide mixture can be, for example, granulated blast furnace slag, metakaolin, slag, fly ash, activated clay or a mixture thereof. The alkaline medium for activating the binder usually consists of aqueous solutions of alkali carbonates, sulfates, fluorides and, in particular, alkali hydroxide and/or soluble water glass. It is stated that alkali or alkaline earth hydroxides should preferably be used as activators, alkali hydroxides being preferred because of their high general quality. The hardened binders are said to have high mechanical and chemical resistance, to be less expensive and more durable than cement, and to have a more favorable $CO_2$ emission balance. In one variant, the mixture is said to contain granulated blastfurnace slag, fly ash and/or microsilica as binders, which is said to contribute to better acid resistance of the binder (mixtures), mainly due to their preferentially high content of aluminate and silicate. The above-mentioned binders should be amorphous to a high degree and have relatively high and reactive surfaces. This accelerates the setting behavior. The proportion of aluminate (as $Al_2O_3$) and silicate (as $SiO_2$) should preferably total more than 50% by weight, and particularly preferably more than 60% by weight, based on the total mass of the binder (mixture). Ground granulated blast furnace slag as a particularly preferred alkali-activatable aluminosilicate binder can be used, preferably in an amount between 5 and 90 wt. %, preferably between 5 and 70 wt. %, in each case based on the total weight of the mixture. The granulated blast furnace slag can be used, preferably in the above-mentioned amount alone, or together with pozzolans, micro-silica and/or fly ash.

WO 2010 1218861 A1 attributes the low shrinkage of the "aluminosilicate"-containing precursor mass to the formation of calcium silicate hydrate. It is stated that the calcium silicate hydrate (CSH) and calcium aluminate hydrate (CAH) phases in the cement have the property of being relatively stable to alkalis, and that the properties of the hardened building materials can be controlled by a suitable selection of binders. Accordingly, it is explicitly not a question of a chemical reaction of calcium aluminate with silicon under basic conditions, but only of the per se well-known hydration as physical water absorption of cement.

With regard to the mode of action of cement containing calcium aluminate, it is stated that the alkaline cement acts as an activator when mixed with water, so that setting or hardening begins. It is stated that, according to the citation, this enables a 1-component system to be provided which can only be activated by the addition of water for setting and hardening; the alkaline cement thus acts via hydration. It is emphasized that cement is chemically relatively stable to alkalis. According to WO 2010 1218861 A1, cement itself need not be present at all; in fact, according to WO 2010 1218861 A1, mixtures that do not contain cement are even preferred. It is also mentioned that cement is relatively stable to alkalis, i.e. it does not react chemically. This shows that WO 2010 1218861 A1 does not consider calcium aluminate as a necessary starting material for a new material.

It should also be mentioned that inorganic polymer binders have been proposed, among other things, for the production of a coating on metallic surfaces using the material, compare DE 10 2005 046 912 A1. There it is proposed that the inorganic polymer binder is a hardening binder containing as components 3%-80% thermally activated oxide mixture, 3%50% alkali hydroxide, up to 50% alkali water glass and 80%-20% other additives (including water). This publication limits the calcium aluminate content to 0.5-5 wt.-percent, but provides for a preferred content between 0-25 wt.-percent, the most preferred weight content between 0-15 wt.-percent, and the most preferred weight content between 0-10 wt.-percent. In addition, a combination of water glass and alkali hydroxide is not described. Rather, it is stated with regard to the material for coating metallic substrates and surfaces in DE 102005046912 A1 that the material is a chemically resistant inorganic polymer binder, based on a cold-curing binder and free of calcium compounds. Also in one example, calcium aluminate is only mentioned as a further additive among several others and is not supposed to make up more than 2%.

However, the use of geopolymers cannot satisfy all needs. For example, in the case of many previously known geopolymers, the reaction does not occur by itself at room temperature due to their endothermic nature. Rather, heat must be supplied to form the negative Al centers. Another frequent objection to the use of geopolymers is that the required quantities of water glass for cement substitution are not available (at least not today) and that fly ash and granulated blast furnace slag have long been used as aggregates for today's Portland cement. The need for a heat supply is often undesirable, As far as the availability of water glass is concerned, the production of water glass could be scaled up and even be $CO_2$-neutral if the electricity required for water glass production were to be generated from solar energy. In contrast, fly ash, granulated blast furnace slag and granulated blast furnace slag, which will no longer be available in the desired $CO_2$-free economy, pose a greater problem.

However, conventional concrete not only suffers from the considerable $CO_2$ emissions associated with the production of the cement required for concrete manufacture, but aggregates used in concrete production are also scarce resources. It should be noted that one ton of concrete contains on average only about 150 kg of cement, which is particularly harmful to the climate, while the rest consists of sand and gravel, which are also becoming scarce worldwide, see the article "Technology Assessment on Concretes of the Future—Challenges and Opportunities," by Matthias Achternbosch in: Concretes of the Future, Challenges and Opportunities, 14th Symposium Building Materials and Structural Conservation Karlsruhe Institute of Technology (KIT), Mar. 21, 2018 reported.

One particularly disturbing aspect is that conventional concrete types can only be mixed with particles larger than 2 mm in diameter problem-free, among other things due to their high viscosity. With particle diameters of less than 150 pm, the particularly round desert sand and fine sand, on the other hand, are unsuitable for many conventional concrete types, as P. Albers, H. Offermanns, M. Reisinger, report in "Sand as a raw material, crystalline and amorphous," Chemie in unserer Zeit, 30 (2016), 162-171. In addition, where smaller particles are added, the energetic effort to distribute the particles sufficiently evenly in a mass that has not yet hardened is very high, both mechanically and energetically. Both the economic and ecological costs thus increase considerably.

In addition, even where concrete is still to be used despite the climatic problems, it does not always meet the requirements despite the many years of development of ever better types of concrete; this applies in particular because the temperature stability of concrete is often insufficient. For example, concrete decomposes above about 600° C., which leads to problems especially in fire protection and tunnel construction; in the event of a fire in a tunnel, temperatures of well over 600° C. must be expected, see also Ulrich Schneider, "Behavior of concrete at high temperatures," HEFT 337 (1982), DEUTSCHER AUS SCHUSS FOR STAHLBETON.

Against this background, it is desirable to be able to offer alternatives to conventional concrete that can be classified as climate-friendly or at least more climate-friendly and that achieve at least some of the desired positive properties of conventional concrete or even have better properties.

It is therefore desirable, among other things but not exclusively, to provide a material that can be used as a concrete substitute, has at least the same strength as conventional concrete, is superior to it in terms of temperature resistance and $CO_2$ balance, and in particular, if necessary, allows desert sand or fine sand to be used as an aggregate.

In addition, there are other problems with conventional, marketable materials that make certain applications more difficult or prevent them, for example because there are no suitable processing options. For example, it may be desirable to produce structures or structural elements using new processes such as 3D printing, but this then requires different or at least precisely controllable curing times, viscosities, etc. in view of available processing machines, which is why neither conventional concrete nor conventional ceramics permit easy processing.

Here, it would be desirable to provide a material that opens up new application or processing possibilities that are not or not readily accessible with conventional materials having comparable final properties, in particular to enable easier, more precise, faster and/or less energy-intensive processing, or even to open up applications where neither ceramics nor concrete are currently used, for example to replace the currently common glassing-in of radioactive substances for final or intermediate storage.

It would be desirable to solve, at least partially, some of the problems mentioned.

The task of the present invention is to provide something new for commercial use.

BRIEF DESCRIPTION OF THE INVENTION

The solution of this task is claimed in independent form. Preferred embodiments can be found in the dependent claims.

Thus, a first basic idea of the invention is to form with Si, Al, Ca, O and at least one of Na and K a solid in which in the Al-MAS-NMR spectrum of the solid compared to the Al-MAS-NMR spectrum of calcium aluminate an additional signal is present which has a chemical shift which is between that of the main peak of calcium aluminate and the peak of calcium aluminate which is closest to the main peak towards higher field.

As understood by the applicant, a material with such a spectrum is novel because the structure leading to the spectrum is itself novel and the spectrum described is characteristic of the novel material. The novel material can therefore, in the present view, be unambiguously identified by the spectrum without further ado.

The fact that the solid is formed with Si, Al, Ca, O and at least one of Na and K obviously does not mean that the elements mentioned need only be present in traces, but refers to the fact that essential areas of the solid, for example a matrix embedding aggregates, are built up with these elements as essential components. It will be readily understood that without deviating from the invention, for example, aggregates may be present which consist of other material and thus do not themselves yield the described spectrum.

The Si, Al, Ca, alkali metal and O contained in the material can be provided, for example, by reaction of water glass, calcium aluminate, water and alkali hydroxide or alkali hydroxide solution. The use of water glass is not even absolutely essential. Water glass provides silicon for the solid-state material, which is capable of tetrahedral bonding; however, it is also possible to provide the silicon tetrahedra by other means besides water glass, in particular by nanoparticulate silica. One example is Köstrosol, for example Köstrosol 1540, an aqueous dispersion of synthetic, amorphous, nanoscale $SiO_2$ particles. However, for cost reasons, the use of water glass is clearly preferred in most cases. Per se and as a rule, all types of water glass are suitable for the reaction, irrespective of the type of alkalization or modulus value. Thus, in particular, the use of water glass of low purity for technical applications is also possible without further ado for purposes of the present invention.

In the reaction leading to the novel material according to the invention, negatively charged aluminum tetrahedra of the calcium aluminate react—activated by OH groups—with charge-neutral silicon tetrahedra, which are provided, for example, by the water glass; it should be noted that the negative charge of the Al tetrahedra in the calcium aluminate is compensated by Ca2+ ions. Moreover, since the reaction is activated by OH-groups, the calcium aluminate will not react with pure water glass solution without a sufficiently strong hydroxide being present, as provided by NaOH or KOH.

Such a reaction can be identified by the new formation of defined Al—O—Si bonds, which can be clearly seen in the $^{27}Al$ MAS NMR.

In this respect, the literature initially contains numerous references on the interpretation of $^{27}Al$ spectra, cf. e.g., C. Gervais, K. J. D. MacKenzie, M. E. Smith, "Multiple magnetic field Al solid state NMR study of the calcium aluminates CaAl407 and $CaAl_{12}O_{19}$" in Magn. Reson. Chem. 2001, 39, 23-28; or K. J. D. MacKenzie, I. W. M. Brown, R. H. Meinhold, "Outstanding Problems in the Kaolinite-Mullite Reaction Sequence Investigated by Si and $^{27}Al$ Solid-state Nuclear Magnetic Resonance: I, Metakaolinite," J. Am. Ceram. Soc. 68, (1985), 293-297, and by P. S. Singh, M. Trigg, I. Burgar, T. Bastow, "Geopolymer formation processes at room temperature studied by Si and Al MAS-NMR," Materials Science and Engineering A 396 (2005) 392-402.

The signals in the range of a chemical shift of 0 to 100 ppm with respect to $AlCl_3*6H_2O$ as the usual external standard to which the chemical shift is referenced are thus assigned as follows.

Al(VI) at 11.77 ppm
Al(V) at 47.19 ppm
Al(IV) at 77.68 ppm (main peak)

Pure calcium aluminate also exhibits these peaks and the peaks can also be seen in the spectra of the material according to the invention, albeit with different intensities but at approximately the same ppm values. It is characteristic for the material according to the invention that in addition to the above signals of the starting material calcium aluminate a new signal appears between the signal assigned to Al(IV) and the signal assigned to Al(V), even if this may not be seen as a completely iso lated, separate peak due to superpositions, but as a shoulder of the Al(IV) signal on the side of the higher field.

In the opinion of the applicant, this additional signal or the added shoulder in the Al spectrum can be explained by a reaction in which new bonds are formed from Al(IV) via oxygen to Si centers by the substitution of already existing Al(IV) centers. In this respect, it should be explained in more detail that, according to the applicant's understanding given on the filing date, the reaction taking place is a covalent bond formation between Al and Si tetrahedra and not a hydration reaction.

As mentioned, pure calcium aluminate shows a sharp signal in the Al-MAS-NMR spectrum at 78 ppm, which is assigned to the negatively charged Al tetrahedra, and a broader signal at 12 ppm, which is assigned to sixfold coordinated Al atoms. When calcined calcium aluminate is mixed with water, it hardens in the course of a conventional hydration reaction, which leads to the complete disappearance of the tetrahedral signal of aluminum at 78 ppm, because the aluminum, which is fourfold coordinated before hydration, is completely converted into sixfold coordinated aluminum during hydration. Therefore, upon hydration, the signal at 12 ppm increases by the proportion by which the signal at 78 ppm decreases. In the case of an excess of water, the signal at 78 ppm even disappears completely due to hydration.

However, in the presently described new reaction leading to the novel solid, this is different. Although water is added, e.g., in the form of water contained in a water glass solution or in the form of make-up water, almost all of the aluminum remains fourfold coordinated. It does not react off in the form of hydration to form sixfold coordinated aluminum.

In this respect, it is also possible to characterize the new material even more precisely by the fact that a peak related to the calcium aluminate signal is also present in the Al-MAS-NMR spectrum of the solid. This is at a chemical shift around 78 ppm, while ideally and with good spectrometers it is at the same time so strong that it is at least 3s (sigma) above the noise. It should be noted that, for example, noise can cause slight shifts in this peak, so that the maximum of the signal can shift by about ±0.5 ppm. Preferably, the solid formed with Si, Al, Ca, O and at least one of Na and K is thus further described in that a calcium aluminate signal is also present in the Al-MAS-NMR spectrum of the solid, at a chemical shift of 78 ppm, this calcium aluminate signal being at least 3s (sigma) above the noise.

It should be noted that the position of the 78-ppm chemical shift signal is very stable in frequency, whereas the additional signal may have a varying chemical shift; thus, the position of the maximum of this additional sigma signal, between about 65-59 ppm. More precisely, the position of the signal maximum thereby varies depending on the proportion of aluminum relative to the proportion of silicon, because the additional signal related to the Al—O—Si bonds is the further away from 65 ppm and the closer to 60 ppm, the larger the Si proportion relative to Al is.

However, the chemical shift will regularly be between 65 ppm and 59 ppm, which is why it can be reasonably assumed, even taking into account noise occurring during the measurement, that the additional signal is to be found at a chemical shift between 67 ppm and 57 ppm, preferably between 65 ppm and 59 ppm. Accordingly, in a preferred embodiment, it may be preferable to describe the novel solid even more precisely in such a way that the chemical shift of the additional signal is between 67 ppm and 57 ppm, in particular between 65 ppm and 59 ppm.

It should be noted that, moreover, the additional signal can in any case be regarded as present if it lies sufficiently clearly above the noise. In conventional spectra, this is considered to be the case if the additional signal is at least $3\sigma$ (sigma) above the noise. In a preferred embodiment, the additional signal will be at least $3\sigma$ (sigma) above the noise.

It will be understood, moreover, that—apart from noise and possibly a different spectral resolution—the specific Al-MAS NMR spectrometer used has no significant effect on the spectrum.

Furthermore, the newly formed, defined Al—O—Si bonds may not only be detected in an Al-MAS NMR spectrum by means of the additional signal, but may also be identified by a band in the IR spectrum at about 960 $cm^{-1}$ to 910 $cm^{-1}$. Preferably, the solid formed with Si, Al, Ca, O and at least one of Na and K can thus be further characterized by having a band in an IR spectrum at about 960 $cm^{-1}$ to 910 $cm^{-1}$.

Although the solid can be identified and described particularly clearly by three spectral properties, namely by the band in the IR spectrum around 950 $cm^{-1}$, a signal in the Al-MAS-NMR signal at 77.7 ppm corresponding to the aluminum tetrahedra used and an additional signal in the Al-MAS-NMR signal between 67 ppm and 57 ppm, in particular between 65 ppm and 59 ppm, a characterization referring to all three spectral properties is usually not absolutely necessary.

Moreover, it will be clear that the skilled person could possibly alternatively and/or additionally describe the solid formed with Si, Al, Ca, O and at least one of Na and K by the fact that in the Al-MAS-NMR spectrum a signal is to be found at 77.7 ppm and an additional signal between 67 ppm and 57 ppm, in particular between 65 ppm and 59 ppm. It may therefore not be necessary to refer to the higher field of the calcium aluminate peak closest to the main peak. Obviously, this also applies to the solid in its preferred embodiments as well as to the materials formed therewith, for example provided with additives, and the corresponding uses.

It should also be pointed out that, due to the new Al bonds formed during the reaction, less aluminum is available for those bonds which were previously present in the calcium aluminate and contributed there to the structure of the pure calcium aluminate spectrum, and thus the calcium aluminate spectrum, to which the new signal is added, is changed to that extent. The formation of the new bonds thus changes the relative peak heights found in the spectrum of pure calcium aluminate.

It should also be emphasized once again that the Al-MAS NMR spectrum of the novel material differs significantly from Al-MAS NMR spectra of other materials, especially the spectra of Roman concrete and modern geopolymers.

Modern geopolymers will typically exhibit at most a signal in the Al-MAS NMR signal that is at 50 ppm rather than the approximately 65 ppm relevant here; for the substance here, the signal is between 59 and 65 ppm; moreover, the spectra of modern geopolymers lack a signal with a shift around 78 ppm.

Moreover, the signal peak around 78 ppm, which is characteristic of calcium aluminate, is not found in the spectrum of either tobermorite or Roman concrete, cf. "Unlocking the secrets of Al-tobermorite in Roman seawater concrete" by Marie D. Jackson, Se-jung R. Chae, Sean R. Mulcahy, Cagla Meral, Rae Taylor, Penghui Li, Abdul-Hamid Emwas, Juhyuk Moon, Seyoon Yoon, Gabriele Vola, Hans-Rudolf Wenk, and Paulo J. M. Monteiro, Cement and Concrete Research, Volume 36, Issue 1, January 2006, Pages 18-29). FIG. 11 is taken from this paper.

The absence of the signal peak around 78 ppm chemical shift is incidentally explained for Roman concrete by the fact that in the production of Roman concrete the starting materials must first be converted in such a way that the Al tetrahedral structures associated with the signal peak are first formed, unlike in the present material, in the production of which starting materials with the required Al tetrahedral structure are available from the outset. This also means that the material properties attributable to the —O—Si—O—Al—O bonds to be formed can be controlled particularly well in the novel material and that a high degree of reproducibility of desired material properties can be achieved.

It has already been emphasized that the formation of the new bonds, which take place during the chemical reaction forming the solid according to the invention, changes the signal heights of the various peaks in the Al-MAS-NMR spectrum of calcium aluminate, while at the same time the characteristic, additional signal is formed in the Al-MAS-NMR spectrum. Therefore, not only the exact chemical shift at which the characteristic, additional signal is present depends on the ratio of silicon to aluminum, but also the signal heights or the areas to be assigned to the respective signals in the spectrum change. This is particularly advantageous because it allows the ratio of silicon to aluminum to be easily determined on the finished material. This, in turn, is of importance because it is possible to produce solids according to the invention with different proportions of calcium aluminate; certain desirable properties, such as compressive strength and chemical resistance, are improved if the proportion of—comparatively expensive calcium aluminate is increased. In particular, this makes it possible to check quickly and reliably whether a material conforms to agreed compositions.

It turns out that the stoichiometric ratio between the silicon and aluminum tetrahedra can be freely adjusted in a range from 1:1 to 1:12, even if, from a price point of view, only mixtures in a ratio of 1/1 to about 1/8 make sense. Particularly large amounts of calcium aluminate in the production of a solid with aggregates do not lead to an ever increasing compressive strength; on the contrary, the curve "compressive strength versus calcium aluminate content" shows a pronounced maximum, so that the additional costs for a particularly high content do not bring any advantages, especially with regard to compressive strength.

In particular for solids which are used as matrix formers or binders in a construction material containing aggregates, the Si/Al ratio is therefore less than 1 but greater than 0.1, in particular less than 1 and greater than 0.105, in particular less than 1 and greater than 0.125. Since this ratio can be recognized from the Al-MAS-NMR spectrum, it is at the same time preferred if the solid formed with Si, Al, Ca, O and at least one of Na and K for those parts of the solid which in the Al-MAS-NMR spectrum lead to the calcium aluminate signal and the additional signal, has an Si/Al ratio which can be determined on the basis of the signal strengths of the calcium aluminate signal and of the additional signal and/or on the basis of the signal areas of the calcium aluminate signal and of the additional signal and is less than 1 and greater than 0.1, in particular less than 1 and/or greater than 0.105 or greater than or equal to 0.125.

Accordingly, in the production of the solid by bringing into contact water glass, sodium and/or potassium hydroxide, calcium aluminate, one or more additives and, if appropriate, additionally water, it is also particularly preferred if such amounts of water glass and calcium aluminate are used which result in an Si/Al ratio in the solid which is less than or equal to 1, in particular less than 1 and greater than 0.1, preferably less than 1 and greater than 0.105, preferably less than 1 and greater than 0.125. Preferably, water glass (or water glass solution), alkali hydroxide and water are first brought into contact and then the calcium aluminate is mixed in.

It is obvious that this also opens up a control procedure by which it can be spectroscopically checked whether the agreed proportion of calcium aluminate has been used for the production of a solid. This is obviously particularly important in view of the comparatively high costs of calcium aluminate at present, although it is obviously possible to produce an inadequate solid even if the agreed proportion of calcium aluminate is maintained, for example because there is a large deviation from a reasonable amount of activating lye. In this respect, it should be pointed out that, in addition to the proportion of calcium aluminate and sodium silicate, the required amount of activating caustic also results from a selected Si/Al ratio. On the other hand, it should be pointed out that it is possible in principle to produce a solid with, in particular, an excess of NaOH as activating lye, but that even an excess of NaOH of a few percent can reduce the final strength quite considerably. In view of the relatively low cost of NaOH, however, deliberate deviations from the required stoichiometric ratios are unlikely.

As far as stoichiometry is concerned, it should first be noted that although a mixture of calcium aluminate and pure water glass such as commercially available sodium silicate with a modulus value of s=4 (and thus with an Si/Na+ ratio of 2:1) would theoretically lead to an Si/Al ratio of 2:1, such a mixture will not react because the free base for activation (e.g., NaOH) is missing.

Mixtures are only reactive at a ratio of Si/Al~1. The upper limit of the alkali ratio is set by its viscosity (as an aqueous solution). Solutions of alkali in water glass with an alkali ion content of more than 1.5, based on the alkali ion content of the water glass, can no longer be mixed with solid calcium aluminate because of their high viscosity.

The lower limit of feasible mixtures is at a ratio of about Si/Al~1:8. Higher calcium aluminate amounts (for ratios between 1/8 and 1/12) can be homogeneously mixed with undiluted water glass only with the addition of water. However, this results in hydration of the calcium aluminate and not the desired hydration-competition reaction of the calcium aluminate, which leads to less stable products.

Therefore, Si/Al ratios are only useful from Si/Al~0.125 (i.e., 1/8). With respect to the alkali ratio, it can be shown that the following conditions should be satisfied: when referring to sodium, the ratio of calcium ions of the calcium aluminate to alkali ions from water glass or the activating alkali (i.e., NaOH) should be in the ratio 1:2 or greater; Al and Na should be present at least in the ratio 1:1, but the Al/Na ratio can also be greater than 1, which allows a calcium aluminate excess.

The concentration of OH ions used, as well as the concentration of Al tetrahedra, also determines the reaction rate; a high concentration of OH ions lead to a faster reaction; the same applies to the concentration of Al tetrahedra. Thus, the higher the concentration of aluminum tetrahedra and the higher the concentration of NaOH in the mixture, the faster a material-forming mixture cure. The curing times can be set between several hours and a few minutes or even below, with the longer curing times mentioned being achieved at an Si/Al ratio close to 1 and the shorter waiting times for a Si/Al ratio at the lower limit indicated as reasonable.

From the above it follows that the solid can be obtained by contacting a silicon tetrahedral source, in particular water glass, sodium and/or potassium hydroxide, calcium aluminate, one or more aggregates and, if necessary, additionally water.

As far as the silicon tetrahedral source is concerned, reference is made to the use of water glass at further points in the description. However, it should first be mentioned that the use of water glass is not mandatory. Rather, other silicon tetrahedral sources can also be used, for example silicon dioxide nanoparticles. For cost reasons, however, water glass is the preferred silicon tetrahedral source for very many applications. In this regard, at least at the time of filing, sodium water glass, sometimes referred to as sodium water glass, is clearly preferred for cost reasons.

Different water glasses, including different sodium water glasses, differ with respect to several properties. Water glasses are usually made of sand and Na or K carbonate. They consist of silicates which are easily soluble in water and whose negative charge is compensated by monovalent counter cations (M+). Water glasses are therefore often characterized by their s-value, which indicates the mass ratio $SiO_2/M_2O$ (M=alkali metal); the smaller the s-value, the more alkali metals are present. Water glasses with different s-values are available at Han del. The s-value of a water glass determines the chemical constitution of the silicate. With an s value of s=1, the silicate has on average a negative la dung. Theoretically, the s-value can drop to as low as 0.25. Water glasses with s-values up to about 8 are known. For example, water glasses with an s-value of 0.4-5 were used for various experiments on the present invention.

Aqueous solutions of water glasses are viscous. Soda water glasses generally result in a higher viscosity than potassium water glasses for the same $SiO_2$ content (s-value). For the preparation of the material according to the invention, experiments were successfully carried out with water glass solutions having a solids content of about 22 to 52 wt.-percent, because these water glass solutions were readily available commercially. These water glass solutions have been found to be useful.

It is possible to use a single sodium water glass grade or a mixture of different sodium water glasses. In addition, a potassium water glass, sometimes referred to as potassium water glass, or a mixture of different potassium water glasses can be used. According to another embodiment, a mixture of sodium and potassium water glasses or glasses is used, such as a 90:10 to 10:90 mixture. Thus, in particular, one or more water glasses may be used for the preparation of the inorganic material of the present invention. It should be emphasized in this respect that in the present application the term "water glass" may also be used to refer to mixtures of different water glasses by way of simplification.

Since potassium water glasses and KOH sometimes react much faster than sodium water glasses and NaOH, it can be advantageous to use potassium material, especially where fast curing times are desired, for example in inorganic instant adhesives or 3-D printing of very fine structures, although this is not only more expensive but also has to be used in larger quantities by weight due to its higher molecular weight, all other things being equal.

For particularly inexpensive solids that are required in large quantities, for example as binders to be used in construction, on the other hand, the less expensive sodium water glasses are preferred, especially in technical grade or purity.

It should also be mentioned that it is possible to create a hydrophobic or lipophilic solid by choosing water glasses that have an organic residue. For example, instead of using only purely inorganic water glasses, it is also possible to use a water glass that has a propyl radical, such as Protectosil WS808 from Evonik. In tests, octyl triethoxysilane and Rhodarsil R51T (tripotassium methylsilane triolate, a methyl siliconate) have also proved lipophilizing. Although inorganic water glass can be fully replaced, if necessary, lipophilization of the material has been shown to be continuous even at low percentages. For example, an admixture of 0.5-3% octyl triethoxysilane has led to such a consistent lipophilization of the material that it can be ground or drilled without losing its water-repellent properties at the grinding or drilling points. The functionalization is thus continuous in the volume, i.e. the solid is hydrophobic or lipophilic throughout the volume. In the case of the other hydrophobic silicates tested, Rhodarsil R51T and Protektosil WS 808, an admixture in the % range is also sufficient for continuous lipophilization. In addition to the organic, hydrophobic siloxanes and silicates used in the experiments and explicitly mentioned here, it should be anticipated that other comparable, commercially available modified silicas can be used.

Mention should therefore also be made of further monosiloxanes, in particular trimethoxy-n-octylsilane, dimethoxymethyl-n-octylsilane or diethoxymethyl-n-octylsilane, disiloxanes, in particular hexamethyldisiloxane, octamethyltrisiloxane, decamethyltetrasiloxane or also polydimethylsiloxanes, in particular dimethicones (polydimethylsiloxane) and cyclomethicones (such as, for example, octamethylcyclotetrin). e.g., octamethylcyclotetrasiloxane, decamethylcyclopentasiloxane) as well as silyl ethers, in particular trimethyl silyl ether (TMS), triethyl silyl ether (TES), tert-butyldimethyl silyl ether (TBDMS), tert-butyldiphenyl silyl ether (TBDPS) or triisopropyl silyl ether (TIPS). The exact choice of functionalizing organic silane(s) will depend on both the cost and the specific functionalization of the material required in each case. It is also clear that a material that is already functionalized throughout during production has clear advantages over a material that is only functionalized by a subsequent coating. In the construction sector, for example, this opens up the possibility of providing surfaces that are easy to clean and remain functional even in the event of damage.

In a particular embodiment, the solid according to the invention will thus be a hydro phobic or lipophilic solid, in particular a solid that is hydrophobic or lipophilic throughout its volume. It will be understood that such a solid can be prepared by further providing, in a preparation process comprising contacting a silicon-tetrahedral source, sodium and/or potassium hydroxide, calcium aluminate, one or more additives and optionally additionally water, that silanes bearing organic groups are admixed or used exclusively, in particular in a proportion of 0.2 to 5, preferably 1-3% by weight of the binder or matrix former.

As far as the source of the Al tetrahedra is concerned, according to the present understanding of the applicant, only calcium aluminate is suitable.

For example, a commercially available calcium aluminate such as Secar® 71 from Kerneos Inc. or a calcium aluminate from Almatis GmbH such as CA-14 or CA-270 can be used. It should be emphasized here that the reaction involved here is a covalent bond formation between Al and Si tetrahedra and not a hydration reaction. In contrast to a hydration reaction, it is not necessary to form a solid structure with crystallization, and the calcium aluminate does not necessarily have to be fired; rather, it is sufficient if Al tetrahedra are present with the counterion calcium. This represents a considerable advantage, because the calcium aluminate to be precipitated can also be produced wet-chemically at room temperature, e.g. from sodium aluminate and $CaCl_2$ or $CaSO_4$. Such a wet-chemical production of the calcium aluminate has a significant positive impact on the overall $CO_2$ balance of the novel material.

The novel solid does not have to be used in its pure form. Rather, it is possible to incorporate other materials, in which case the solid according to the invention can act as a matrix material or binder.

In the production of the solid, a liquid mixture is typically provided for at least a short time, in which water glass, sodium and/or potassium hydroxide, calcium aluminate and, if necessary, additionally water is brought into contact. This makes it possible to impregnate fabrics and nonwovens and thus to produce composite materials, for example fiber mat composite materials such as carbon fiber mat composite materials.

Furthermore, it is readily possible to mix the liquid mixture, or a starting liquid used to provide the liquid mixture, which is not yet reactive, with additives. If necessary, this can be done by mixing the additives into a not yet reactive starting liquid. The fact that only liquids have to be mixed during production and, moreover, that the viscosity is low had a positive effect here. The fact that only liquids are mixed and, moreover, that the viscosity is low allows fines to be mixed in with a very low energy input, i.e. an energy input significantly below that required for the production of UHPC, i.e. current ultra-high performance concrete grades, and at the same time to produce very homogeneous mixtures. These very homogeneous mixtures, in turn, result in low crack formation in the finished material. Because very fine mineral aggregates can be used without a particularly high energy input, it is also possible to use grain compositions that correspond to an ideal grading curve. Moreover, material-forming mixtures have self-compacting properties.

There is also a wide variety of aggregates suitable for use with the material according to the invention. Mention should first be made of mineral aggregates, in particular mineral aggregates selected from the group consisting of coarse crushed stone, sand, quartz powder and/or rock powder.

The mineral aggregates can in particular also be fine sand with an average grain diameter of less than 150 pm, as well as desert sand, even if this has the very round grain shape typical of desert sand, which causes massive problems in conventional concrete; in conventional cement/concrete, only sharp sand with a mean grain size of >2000 mm can be used, whereas in the present invention fine sand and desert sand of round grains with <150 pm mean grain size (grain size determined by sieving; weight average) can also be used. Since, unlike in conventional concrete, alkali impurities do not interfere with the mixture, even sand contaminated with sea salt can be used if necessary. The use of sea sand and river sand should therefore also be mentioned.

It is also possible to use granules as aggregates, even if the granule size is less than 2 mm or at least a significant proportion of the granules is less than 2 mm. This can be assumed if the proportion of a grain size smaller than or equal to 2 mm is at least 5%, preferably at least 10%, in particular preferably at least 25%. Even such small granulations can be mixed in without further ado and without great energy input. This makes the use of concrete recyclate, brick recyclate, road surface recyclate, crushed weathered sandstone, crushed perlite, pumice granules, and/or mixtures thereof as aggregates particularly attractive. As far as recyclates are concerned, it should be particularly emphasized that granules of material according to the invention, if necessary, granules of a material according to the invention mixed with aggregates and/or functionalized, can also be used as aggregates. This opens up the possibility of an ecologically desirable and economically advantageous material cycle.

Fibers can also be used as additives, in particular fibers from the group of rock wool, glass wool, plastic fibers, plastic fibers with OH-functional groups on the surface, inorganic fibers, CNTs, glass fibers, metal fibers, steel fibers, woven fibers, and/or mixtures thereof. Mention should also be made of the usability of renewable additives, in particular wood fibers or other sufficiently durable plant fibers. The admixture of plant fibers is also understood to be the admixture of sawdust or sawdust shavings.

These fibers will typically be longer than 0.3 mm, preferably longer than 1 mm, in order to impart the desired mechanical properties to a sufficient degree. At the same time, fibers will preferably be shorter than 5 cm, in particular preferably shorter than 1 cm; fibers that are too long may have a blocking effect during processing, such as pumping processes, mixing and the like, which should be avoided; said fibers may also be embedded as a fabric, in which case the fibers within a fabric may be longer than said upper limits, since here the risk of blocking pumps, mixers, etc. due to fibers that are too long is at best small. It should be mentioned that an improvement in properties can be achieved by the fibers in a per se known manner.

Plastic materials can also be used as additives, in particular plastic materials selected from the group of plastic materials with OH-functional groups on the surface, polyurethane, foamed plastic materials and/or plastic recyclates. The preference for plastic materials with OH-functional groups on the surface is due to their better incorporation into the material. This also explains why polyurethane-based plastics are preferred over materials such as Styrofoam for embedding. The fact that OH-functional groups on the surface favor integration into a matrix material should also be taken into account with regard to glass fibers, because these often have a coating that is unfavorable for integration. It is also assumed that sand is incorporated into a matrix of material according to the invention by the superficial formation of OH bonds.

It should also be mentioned that inorganic additives can be used as aggregates, in particular inorganic additives selected from the group consisting of inorganic pigments, lead oxides, iron oxides, iron phosphate, calcium phosphate, magnesium phosphate, $BaSO_4$, $MgSO_4$, $CaSO_4$, $Al_2O_3$, metakaolin, kaolin, wollastonite. The use of such oxides allows the material to be used for colored and permanently colorfast sign objects. In addition, shielding properties against radioactive radiation can, if necessary, be improved by suitable additives, e.g., lead-containing additives. Thus, the material according to the invention is also particularly suitable for use instead of the otherwise necessary encapsulation of radioactive waste.

The usability of additives—and, where desired, their combination—considerably extends the possible applications. In this respect, it is pointed out that the use of suitable aggregates results in little, if any, relevant shrinkage occurring during the production of the material. Thus, cracking during material curing is also extremely reduced; however, it should be mentioned that cracking can still occur due to unfavorable material choices; where cracking is to be avoided, it should therefore be noted that cracking is reduced precisely by volume-stable additives.

The use of suitable additives also makes the material particularly suitable for lightweight construction, since high flexural strengths are still achieved even with little filler or matrix material, which then favors the use of thin structures. It should be mentioned that for particularly high requirements in terms of fire protection, the aggregates are naturally limited.

Considerable proportions of aggregates can be added; the preferred quantities of the constituents of a solid mixed with aggregates are as follows:
(a) water glass: 2.5-12.5 wt.-percent (calculated as solid);
(b) alkali hydroxide: 0.7-7% wt.-percent;
(c) water: 6.8-20% wt.-percent;
(d) calcium aluminate: 10-70 wt.-percent by weight; optionally
(e) aggregates such as sand: 0-80% wt.-percent
where the total amount of a, b, c, d and e) is considered as 100%.

It should be mentioned that the large amounts of additives that can be added makes a molded article to be produced with the material according to the invention less expensive.

It has already been emphasized that a solid according to the invention with additives is facilitated on the basis of the use of liquids for the starting material.

In this regard, the material according to the invention can be prepared from a medium viscosity liquid and a powder or, alternatively, from a liquid phase and a high viscosity suspension. When prepared from a medium viscosity liquid and a powder, the medium viscosity liquid may comprise water glass solution and alkali hydroxide, the liquid component having been shown to be stable for at least five months, and the powder component may comprise calcium aluminate and optionally aggregates. These can be mixed in a ratio of 1:1, for example. If, on the other hand, a liquid phase and a highly viscous suspension are to be used for material production, the highly viscous suspension may comprise the waterglass solution, calcium aluminate and any additives; such a suspension has been shown to be stable for about one week, similar to Speis. Long-term stable aqueous alkali hydroxide may be added to this suspension for reaction. Typical ratios of alkali hydroxide: suspension of 1:20 to 1:50 can be used. Processes in which a highly viscous suspension is combined with an alkali hydroxide liquid phase are particularly suitable for 3-D printing. It should be mentioned that where fine sands with a grain diameter of <500 pm are used as aggregate, it has proved advantageous to mix the fine sand first with water glass and lye and then to add the calcium aluminate.

Against this background, it is evident that in a preferred embodiment the process for producing a material according to the invention is carried out by contacting a silicon tetrahedral source, in particular water glass, sodium and/or potassium hydroxide, calcium aluminate, one or more additives and optionally additionally water in such a way that sodium or potassium hydroxide is used as an aqueous solution.

As far as the optional addition of water is concerned, it should be emphasized once again that the present reaction to form the novel material involves a covalent bond formation between Al and Si tetrahedra and not a hydration reaction. For this reason alone, water should not be used in excess.

However, the reactive aluminates used to form the material do absorb a certain amount of water. For example, the calcium aluminates used in the examples consist of 29% CaO and 71% $Al_2O_3$, which corresponds approximately to a 3:1 mixture of "CA" and "CA2", which is why the calcium aluminates used have a molecular formula $(CaO)_4(Al_2O_3)_5$ (C4A5) with a molar mass of 734.

These reactive aluminates absorb the following maximum amounts of water:

However, these hydrates are not stable and then decompose in a process called "conversion" to 3 CaO—$Al_2O_3$*6 $H_2O$, $Al(OH)_3$ and water.

In purely theoretical terms, one mole of the $(CaO)_4(Al_2O_3)_5$ used can thus absorb 38 moles of water, but can only stably bind 8+7=15 moles of water per mole of $(CaO)_4(Al_2O_3)_5$. However, this occurs in the course of a hydration reaction.

With the new binder, on the other hand, it is shown experimentally that almost exactly 10 mol of water are bound per 1 mol of calcium aluminate (C4A5). This indicates that exactly one water molecule per Al center is required in the final product for charge stabilization and corresponds to a lower water incorporation than in a simple hydration of (CaO)4(Al2O3)5.

Therefore, an—albeit limited—amount of water may have to be used. On the one hand, the amount of water influences the viscosity of the reaction solutions, which is advantageous for setting a desired viscosity; the viscosity of the reaction solutions can be set by varying the amounts of starting materials at 20° C. in a range of 25-700 mPa. At the same time, the amount of water—like the calcium aluminate content—influences the curing time, which could be set between 50 sec and 90 min for the compounds investigated here. The ability to adjust the curing times and the viscosities make the material-forming reaction solutions suitable for 3D printing without further ado.

Where water is to be added, distilled or even deionized water is not required; the use of simple tap water is readily adequate, but not even mandatory. Since the material according to the invention-unlike conventional concrete, which contains no alkali ions but a high proportion of calcium and silicon-has a molar ratio of alkali ions (usually Na+ and/or K+) to calcium that is about 1:2, the material-forming reaction is very alkali tolerant. This allows the use of alkali-loaded water, especially sea or salt water. In one embodiment of a process for the production of a material according to the invention by contacting a silicon tetrahedral source, in particular water glass, sodium and/or potassium hydroxide, calcium aluminate, one or more aggregates and water, it is therefore envisaged that sea or salt water is added. The alkali tolerance even allows rock salt to be incorporated, as shown by tests in which stable rocks with up to 80% rock salt could be produced.

The material-forming reaction presented here, in which higher-energy Al(IV)—O—Al(IV) bonds are substituted by lower-energy Al(IV)—O—Si bonds, is also advantageous in that it proceeds exothermically in total. Thus, mixtures for the production of the patented material cured even at temperatures of −24° C., which obviously offers advantages in the reaction process, particularly if the material is to be produced at low temperatures without additional heating measures. In winter construction, this offers a considerable advantage over conventional concrete, which, according to the relevant DIN standard, may not be processed at temperatures below 5° C.

For the course of the reaction forming the material according to the invention, it should be noted that the calcium aluminate used in the reaction does not react with pure water glass solution without a sufficiently strong activator being present to react the negatively charged aluminium tetrahedra of the calcium aluminate activated by OH groups with the silicon tetrahedra provided by water glass. Both NaOH and KOH are suitable activators, whereas the basicity of other, weaker alkalis, such as LiOH or $NH_4OH$, may not be sufficient to start the reaction at normal temperatures.

For a complete conversion, a stoichiometrically correct mixture of the reactants is required, otherwise unreacted reactants remain, which is undesirable in that the stability of the material formed is negatively affected. Likewise, it is considered advantageous if there is a sufficient amount of water in the mixture to be incorporated into the material being formed.

During the reaction, negatively charged Al tetrahedra react with OH ions in a stoichiometric ratio of at least 1:1; the ratio between the calcium ions of the calcium aluminate and the alkali ions, i.e., e.g., Na+ from water glass and from NaOH used for activation, if any, must be 1:2 or greater, since the alkali ions serve to exchange the $Ca^{2+}$ ions that carry the compensating charge for the negative Al tetrahedra in the calcium aluminate. The exchanged calcium ions are completely converted to $Ca(OH)_2$, which precipitates. The precipitation of $Ca(OH)_2$ during the reaction is currently believed to be an important driving force of the reaction, making the use of calcium aluminate essential to the reaction as currently understood by the applicant.

While the material formed will prove to be no longer water stable if too little calcium aluminate is used, it is readily possible to use more calcium aluminate than is stoichiometrically required for the binding of the nations by the negatively charged Al tetrahedra. However, the ratio, $Al^-:Na^+$ should be at least 1:1, whereby the desired pressure and bonding properties are determined by the ratio $Al^-:Na^+$ or $Ca^{2+}:Na^+$, the desired compressive and flexural strengths as well as the curing time can be adjusted. That the curing times also depend on the Si:Al ratio and the amount of water, as is apparent from other parts of the description, should be noted in this connection. In this connection, it has already been disclosed that the ratio of Si tetrahedra and $Al^-$ tetrahedra can be freely adjusted in a Si/Al range from 1/12 to an 1/1. With the expected use of calcium aluminate and water glass as aluminum tetrahedron source and silicon tetrahedron source, respectively, the preselected Si/Al ratio then determines the amount of Ca aluminate to be used as $Al^-$ tetrahedron source relative to the amount of water glass to be added as Si tetrahedron source.

In view of the overall exothermic progress of the material-forming reaction, it will be evident that a process for the production of a material according to the invention by contacting a silicon tetrahedron source, in particular water glass, sodium and/or potassium hydroxide, calcium aluminate, one or more additives and water, is preferably carried out under certain conditions even at ambient temperatures above 30° C., in particular above 35° C., without cooling measures, or is carried out without heating measures at temperatures below +5° C., in particular below 0° C. However, it should be noted that where particularly fast reactions are desired, for example in 3-D printing, an acceleration of the reaction, i.e. an acceleration of the curing, can be achieved by additional heating measures. In this respect, it should be mentioned that it has already been shown experimentally that it is possible to allow the reaction to proceed at least at +60° C. This is not a problem.

Irrespective of the fact that extremely short curing times may be achieved for very special applications, possibly by additional heating, it should be emphasized that even without such measures curing times can be achieved which allow very early stripping of moldings formed in shell molds and also ensure very early high strength. The time until stripping is possible is significantly shorter than for concrete, for example; this can result in very significant cost advantages and quality advantages in view of the likewise very early high strength compared with precast concrete parts.

In this respect, it should be emphasized that the material which can be used as a binder hardens both under water and in air in a temperature range from −20° C. to +80° C. and without shrinkage, whereby the material according to the invention then proves to be absolutely stable against concentrated aqueous acids and alkalis and—provided that suitable aggregates are used—can withstand temperatures of over 1000° C. without loss of stability; tests have also been carried out to show that the material can be exposed to temperatures of up to 2400° C. It is also to be assumed that the material can be used as a binder in a temperature range from −20° C. to +80° C. without shrinkage. It can also be assumed that the material is frost-stable; thus, in initial tests, repeated freeze-thaw cycles did not lead to material damage.

At the same time, with suitable material mixtures, compressive strengths can be achieved that are about twice as high as those of the best-performing grades known at the filing date. The flexural strengths are also considerably higher than those of concrete. For example, bending tensile strengths of up to 17 N/mm, measured according to DIN 1038, were achieved with the material according to the invention in tests, which corresponds to about three times the bending tensile strength achieved with conventional concrete.

Furthermore, compared with concrete, there are advantages in the carbon dioxide balance of up to 75% with the same compressive strength. This is due not only to the low production energy requirement for the material-forming raw materials used, but also to the fact that even very fine aggregates such as dust, fine granular recyclates and desert sands can be incorporated without difficulty and with low mixing energy consumption. It should be particularly emphasized that the wide applicability of different aggregates allows recourse to locally available aggregates, which can thus be transported to a production site with only a low energy input, and/or to renewable aggregates such as wood or wood chips or sawdust.

As can be seen from the above, there are a number of positive properties of both the production process and the finished material which, alone or together, make it particularly attractive for use in a wide range of applications. Among the positive properties of particular technical importance—some of which are obtained independently of the exact composition of the material-forming mixture and some of which can be attributed to additives, in particular readily available low-cost additives and/or additives required in only small quantities—are the rapid curing, the favorable $CO_2$ balance, the worldwide availability of the essential basic raw materials, the consistent dyeability, the usability of fine sand in the micrometer range and/or of desert sand, early mechanical stress without maturing time, algae stability, self-compaction, acid resistance, chloride resistance, the possibility of obtaining ceramic properties depending on the active ingredient without firing, the ability to be divided into different densities, complete recyclability, high-temperature resistance up to 1000° C. and above, e.g. up to 1200° C., the ability to be used with 3-D printers, consistent hydrophobicity, in some cases even significantly increased service life compared with similar materials such as concrete, no shrinkage or shrinkage, the fact that the material can be produced without firing, the fact that it can be used in a wide range of applications, and the fact that it can be used in a wide range of applications. The material can also be cured not only at room temperature but also between +60° C. and −25° C. without the addition of heat, cures under water and is cement-free.

The fact that the material retains its good properties even in contact with organic and vegetable materials opens up applications in the wood sector, e.g. for particleboard as a formaldehyde-free adhesive, for bonding wood-fiber concrete panels and for the manufacture of panels replacing such panels, in wood fire protection, in the replacement of wood concrete and for furniture manufacture.

The fact that the material is non-combustible makes it suitable for use in fire protection. The material can be used, for example, for fire bars with expanded glass, fire bars for windows or fire protection panels in lightweight construction. Its high temperature resistance also makes it suitable for furnace construction.

It should also be emphasized that, due to its good adhesive properties, the material can be used without further ado as a jointing material and tile adhesive. Another advantage is the material's resistance to acids, which improves cleaning possibilities. Due to its chemical resistance, other applications include in particular the manufacture and/or coating of sewer pipes, industrial pipes and separators.

Furthermore, the possibility of embedding color pigments and providing high-quality surfaces, and possibly also functionalized high-quality surfaces such as hydrophobized surfaces, opens up application possibilities, for example, in the manufacture of kitchen countertops, for plasters, acoustic panels, heavy sound insulation, as design concrete and for interior surfaces of parking garages.

It has already been emphasized that the rapid curing of material-forming compounds also makes them eminently suitable as adhesives and as output compounds for 3-D printing.

Since the material is inexpensive, but at the same time offers high durability, other possible applications include tunnel linings, the replacement of ceramic hybrids, the provision of embedding compounds for waste disposal or the use of recycled materials, screed replacement, the use as filling compounds, e.g. for bricks or hollow blocks, and the production of railroad ties and other prefabricated molded parts, whereby rapid curing is of particular advantage, especially in the area of construction materials that have to be produced quickly under high price pressure.

With regard to the production of precast elements, it should also be emphasized that stripping by using oil as a release agent on plastic or metal formwork skins is possible without further ado, despite the low shrinkage, even with conventional formwork, as is also common in concrete production. It should be mentioned that, for example in precast factories or on site, the short cycle times made possible by the short curing times when using a given formwork for the repeated production of similar structural elements can be further shortened, if necessary, by using folding formwork, for example; reference is made only by way of example in this respect to WO 2004 065087A2.

According to the foregoing, it is apparent that a preferred use of the solid body according to the invention is to use it as an adhesive for joining second structural elements and/or for repairing an existing structure, in particular for underwater repair of a structure.

According to the foregoing, it is also evident that another preferred use of the solid according to the invention is to use it as a building material for the construction and/or repair of structures, in particular structures having a required compressive strength of at least 30 N/mm$^2$, preferably at least 40 N/mm$^2$, in particular more than 60 N/mm$^2$ at at least part of the locations using the solid as a building material and/or at locations exposed to chemically aggressive conditions and/or at locations to be built or repaired in the presence of water, and/or in particular to be used as a matrix former in a solid provided with aggregates, which is used as a building or repair material for the aforementioned building bodies.

According to the foregoing, it is further apparent that another preferred use of the solid body according to the invention is to use it for the manufacture of a sanitary ceramic element or for the manufacture of a body needed to withstand temperatures above 700° C., preferably above 1000° C., more preferably above 1500° C. Moreover, where ceramic surfaces are to be formed particularly smoothly, it is obviously advantageous not to use coarse aggregates such as sand which is too coarse. The smooth surfaces obtained without the use of sand make the material readily suitable as a ceramic substitute, with the functionalization offering additional advantages and, moreover, the apparently continuous functionalization being able to offer application advantages over known, only superficial functionalization. An application in which very high temperature stability is desired is the construction of thermal storage systems, in particular high-temperature thermal solar storage systems, in which fluid heated in solar power plants initially flows through a body with a high heat capacity in the event of strong solar radiation, in order to heat it to as high a temperature as possible, and in which cool fluid is subsequently passed through the bodies heated to high temperatures when solar radiation is weak or completely absent, in order to heat the cool fluid and then use this heat, for example to generate electrical energy. These bodies of high heat capacity can be created with the material according to the invention.

With regard to temperature behavior and, in particular, thermal shock behavior, it should be noted, moreover, that the material according to the invention resists thermal shocks well, even very rapid thermal shocks. For example, the material according to the invention could be heated to red heat in a Bunsen burner flame (approx. 1200° C.) and then shock-cooled in water without breaking or cracking, even with repeated, frequent temperature changes. Accordingly, the material is to be regarded as resistant to temperature changes with temperature changes of more than 100° C., preferably more than 200° C., in particular preferably more than 500° C. and very particularly preferably more than 1000° C., both for heating and cooling, the heating and/or cooling by the temperature differences mentioned being able to take place in particular with a rate of temperature change of greater than 100° C./min, preferably greater than 200° C./min, in particular greater than 500° C./min, particularly preferably greater than 1000° C./min; preferably the rate of temperature change is even greater than 1000° C./30 sec, preferably 1000° C./15 sec. That this opens up further applications will be apparent. It was also possible to allow a thermite reaction to proceed in a vessel formed from the material without vessel destruction. This can be considered as a proof of stability up to more than 2000° C.

Likewise, it will be understood from the foregoing that another preferred use of the solid according to the invention is to use it for the production of a coating, in particular an anti-corrosion coating for metals and/or a coating for water-bearing structures, in particular for wastewater pipes and/or surfaces in contact with wastewater to be treated in sewage treatment plants. A coating consisting of or built up with a thin layer of the solid is considered patentable and patentable, as is a composition forming such a coating, in particular a multicomponent composition forming such a coating.

As far as coatings are concerned, these can be formed in a very fine-grained manner or quite smoothly on the surface. Experience shows that tactilely smooth surfaces are obtained with the material according to the invention, provided that no additives such as excessively coarse sand are used. It should be remembered in connection with the use of the material for coatings that functionalization of the material and thus also functionalization of the surfaces can be achieved by additives, such as hydrophobization or lipophilization.

One of the advantages of using the material as a coating is its resistance to biogenic sulfuric acid, which often occurs in sewers. Where cementitious concrete is attacked, a seal formed with the material according to the invention can be applied, provided that entire construction elements are not completely formed with the material according to the invention from the outset. Mention should be made in particular of coatings in sewage treatment plants, where a closed-pored material that is extremely smooth and dense and does not require organic coating is desired.

It is also worth mentioning that the coating material can be applied without the use of volatile solvents, which is a considerable advantage especially, but not only, when processing in closed rooms, especially since the compounds are odorless per se. The coating can also be applied to rusty base material without first derusting it, since the material adheres well, seals well and is stress-free. It will also have to be estimated that the material is more C02-stable than concrete, because a reaction of $CO_2$ with water, if any, could still occur inside the material.

BRIEF DESCRIPTION OF THE FIGURES

The invention is further explained below with reference to the attached drawing by way of example, where in the drawing shows:

FIG. 5: Kinetics of the solid formation reaction based on IR spectra; shown is the change over time of the IR absorption spectrum of a mixture of water glass and calcium aluminate activated with NaOH:

EXAMPLES

Figure 1:
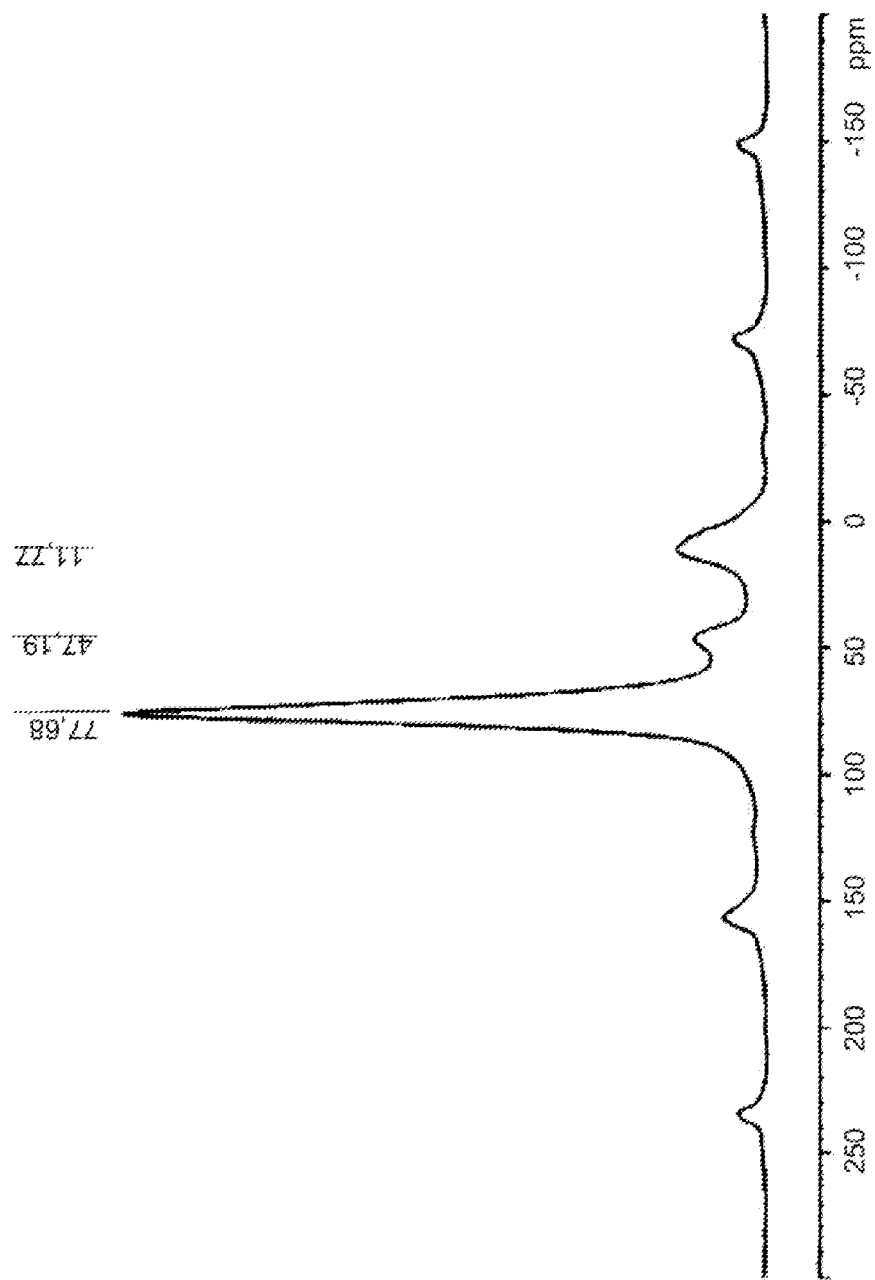
FIG. 1: 27Al-MAS-NMR spectrum of calcium aluminate (Almatis® CA-14).

A number of sample specimens were first prepared in accordance with the present invention in order to investigate the extent to which different mix ratios and starting materials affect the compressive strength and density of the material obtained. In addition, other properties such as the color of the obtained material and the $^{27}$A-MAS-NMR spectra were investigated for some of the samples.

For density determination, the volume and weight of a rectangular sample body were determined and the density was calculated as weight/volume.

The compressive strength of the specimens was measured using a Zwick/Roell Z250 universal testing machine. For this purpose, the compressive forces (in N) were recorded graphically over the deformation distance. The maximum pressure reached was related to the surface area (mm) of the probe.

For the recording of the NMR spectra Al-MAS-NMR spectroscopy could be performed with the following measurement parameters: 4 mm MAS BB/1 H probe in a Bruker AVANCE III 400 WB (magnetic field 9.4 T; rotational frequency 9 kHz) with a frequency of 104.3 MHz for $^{27}$Al, a single pulse excitation (1 μs pulse length; round trip delay 0.5 s), and a 1 M aqueous solution of AlCl$_3$*6H$_2$O as an external standard (0 ppm). In the figures showing NMR spectra, the chemical shift in ppm relative to external standard is plotted on the x-axis and the signal strength in arbitrary units is plotted on the y-axis.

The following materials were used for examples 1 to 9:
- Betolin K35: potassium water glass, s=2.6; Wallner GmbH, aqueous solution with 35%. solids content
- Betol K5020T: potassium water glass, s=1.49; Wallner GmbH, aqueous solution with 48% solids content
- Protectosil® WS808: water glass with propyl radical, s=0.4; Evonik; 55% solids content
- Secar®71: calcium aluminate (Al$_2$O$_3$>68.5%, CaO>31.0%), Kerneos Inc.
- Almatis® CA-14: Calcium aluminate (Al$_2$O$_3$=71%, CaO=28%), Almatis GmbH, Frank furt
- Na48/50: sodium silicate, s=2.6, Wallner GmbH, aqueous solution with 44.5% solids content
- Na50/52DS: sodium silicate, s=1.54, Wallner GmbH, aqueous solution with 48% solids content
- Na38/40: sodium silicate, s=3.4, Wallner GmbH, aqueous solution with 35.8% solids content
- Quartz flour: 1205-SIKRON quartz SF800

Compressive Strength and Density

First, the compressive strength and density of material samples were investigated using various examples 1-4.

Example 1

100 g K35, 100 g K5020T, 36 g WS808, 50 g KOH, 64 g water) were mixed with 600 g Secar® 71 and 60 g quartz flour. The mixture could be stirred for five minutes and was solid after 20 min. The density of the cured material was 2.13 g/cm, the compressive strength 179 N/mm$^2$.

Example 2

100 g K35, 100 g K5020T, 36 g WS808, 50 g KOH, 64 g water) were mixed with 600 g Almatis® CA-14 and 60 g quartz flour. The mixture could be stirred for five minutes and was solid after 20 min. The density and compressive strength of the cured material were comparable to those of Example 1.

Example 3

80 g Na 48/50, 20 g Na50/52DS, 21 g NaOH, 29 g water were mixed with 350 g Secar® 71 and 4.3 g KH$_2$PO$_4$. The density of the cured material was 2.11 g/cm, the compressive strength 132 N/mm$^2$.

Example 4

80 g Na 48/50, 20 g Na50/52DS, 21 g NaOH, 29 g water were mixed with 350 g Almatis® CA-14 and 4.3 g KH$_2$PO$_4$. The density and compressive strength of the cured material were comparable to those of Example 3.

It was therefore found that the compressive strength can be significantly higher than those obtained with concrete on the application date.

Spectra of the Material–1

Solids according to the invention were then prepared using a series of material mixtures with different ratios of water glass to calcium aluminate and examined spectroscopically. For this purpose, the following waterglass-water mixtures were used in Examples 5-7:
- WG1: 9.92 g NaOH dissolved in 20 g water mixed with 100.2 g Na38/40.
- WG2: 19.98 g NaOH, dissolved in 10 g water, mixed with 100.6 g Na38/40

Almatis CA-14 was used as the calcium aluminate.

Example 5

A concrete substitute was prepared from 40 g Almatis® CA-14 and 19.4 g WG1; the mixture was solid and gray in color after 32 min. The density was determined to 2.21 g/cm and the compressive strength to 101.3 N/mm$^2$. (Sample Bl)

Example 6

A concrete substitute was prepared from 40 g Almatis® CA-14 and 9.48 g WG1; the mixture was solid after 3-4 min and of white color. (Sample CI)

Example 7

Figure 2:
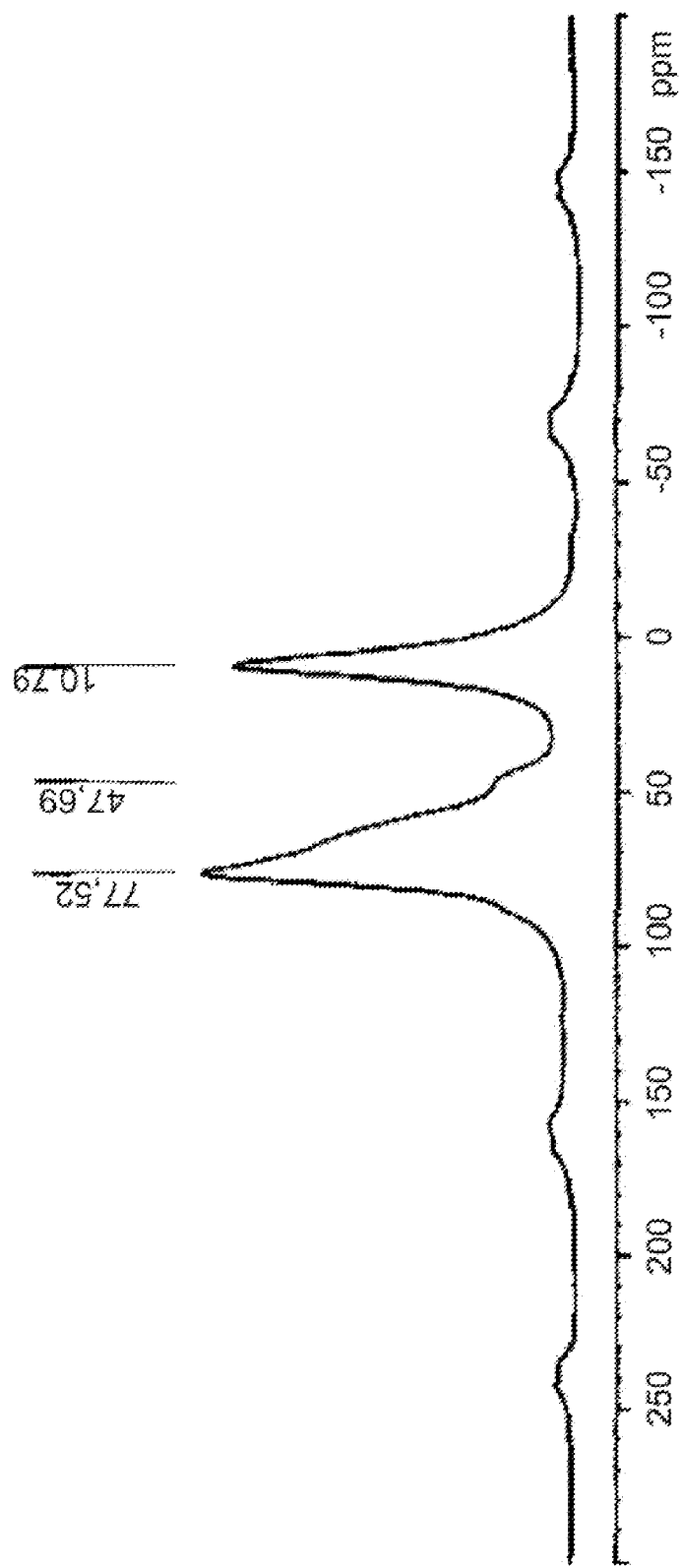
FIG. 2: 27Al-MAS-NMR spectrum of the solid obtained in example 5
Figure 3:
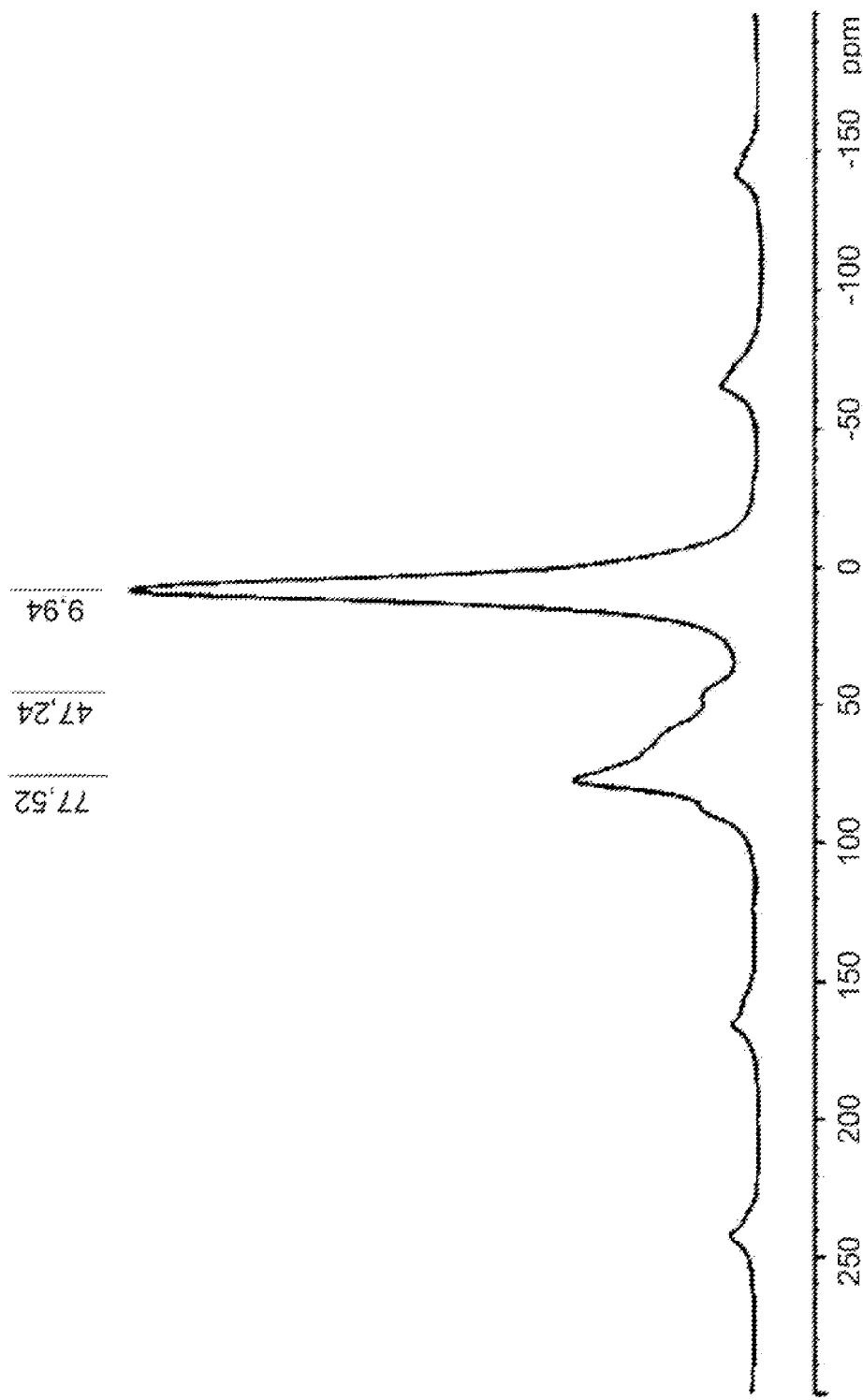
FIG. 3: 27Al-MAS-NMR spectrum of the solid obtained in example 6
Figure 4:
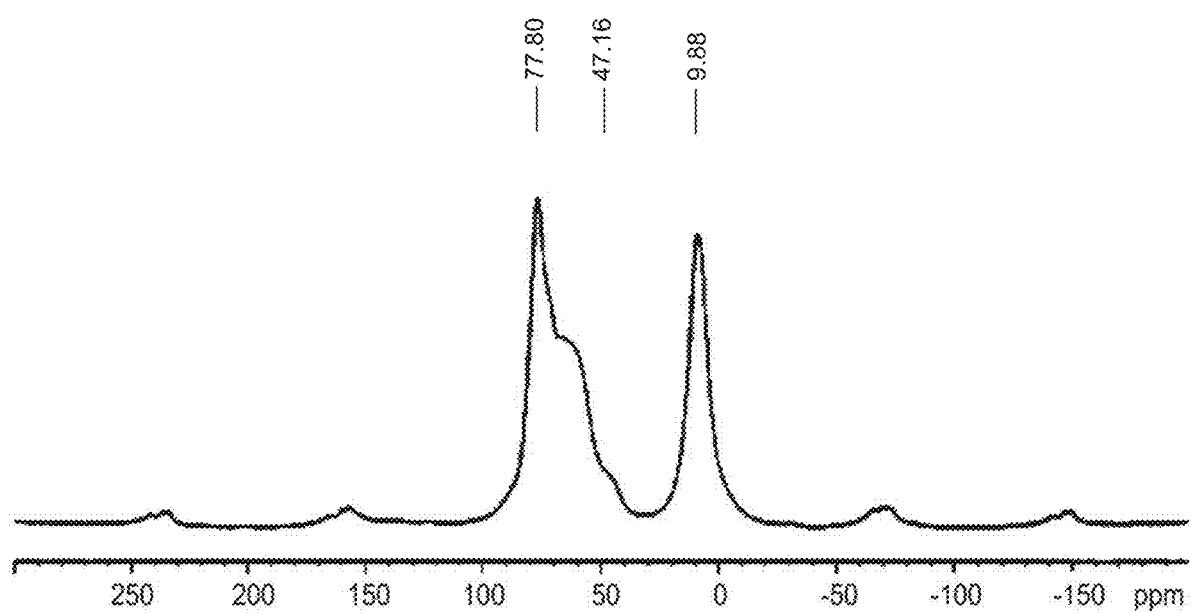
FIG. 4: 27Al-MAS-NMR spectrum of the solid obtained in Example 7.

A concrete substitute was prepared from 40 g Almatis® CA-14 and 28.86 g WG2; the mixture was solid after 20 min and of gray color. The density was determined to be 1.97 g/m. (Per be Dl). The $^{27}$Al MAS-NMR spectra from examples 5-7 are shown in FIGS. 2-4. FIG. 1 (Pro be A) shows in comparison the $^{27}$A-MAS-NMR spectrum of Almatis® CA-14. This 27A1 MAS NMR spectrum shown in FIG. 1 was measured with a 4 mm MAS BB/$^1$H probe in a Bruker AVANCE III 400 WB (magnetic field 9. 4 T; rotational frequency 9 kHz) with a frequency of 104.3 MHz for Al, a single pulse excitation (1 ps pulse length; round trip delay 0.5 s), and a 1 M aqueous solution of AlCl$_3$*6H$_2$O as external standard (0 ppm).

Reference has already been made in the introduction to literature on the interpretation of Al spectra. Taking into account the references cited above, the signals in the range from 0 to 100 ppm in FIG. can be assigned as follows Al(VI) at 11.77 ppm
Al(V) at 47.19 ppm
Al(IV) at 77.68 ppm (main peak)

It should be mentioned that by using a different instrument and/or slightly different measurement conditions the exact appearance of the spectrum could differ somewhat from FIG. 1; however, even then the three characteristic peaks mentioned would be recognizable in the range 0-100 ppm (with $AlCl_3*6H_2O$ as 0 ppm standard).

Figure 11:
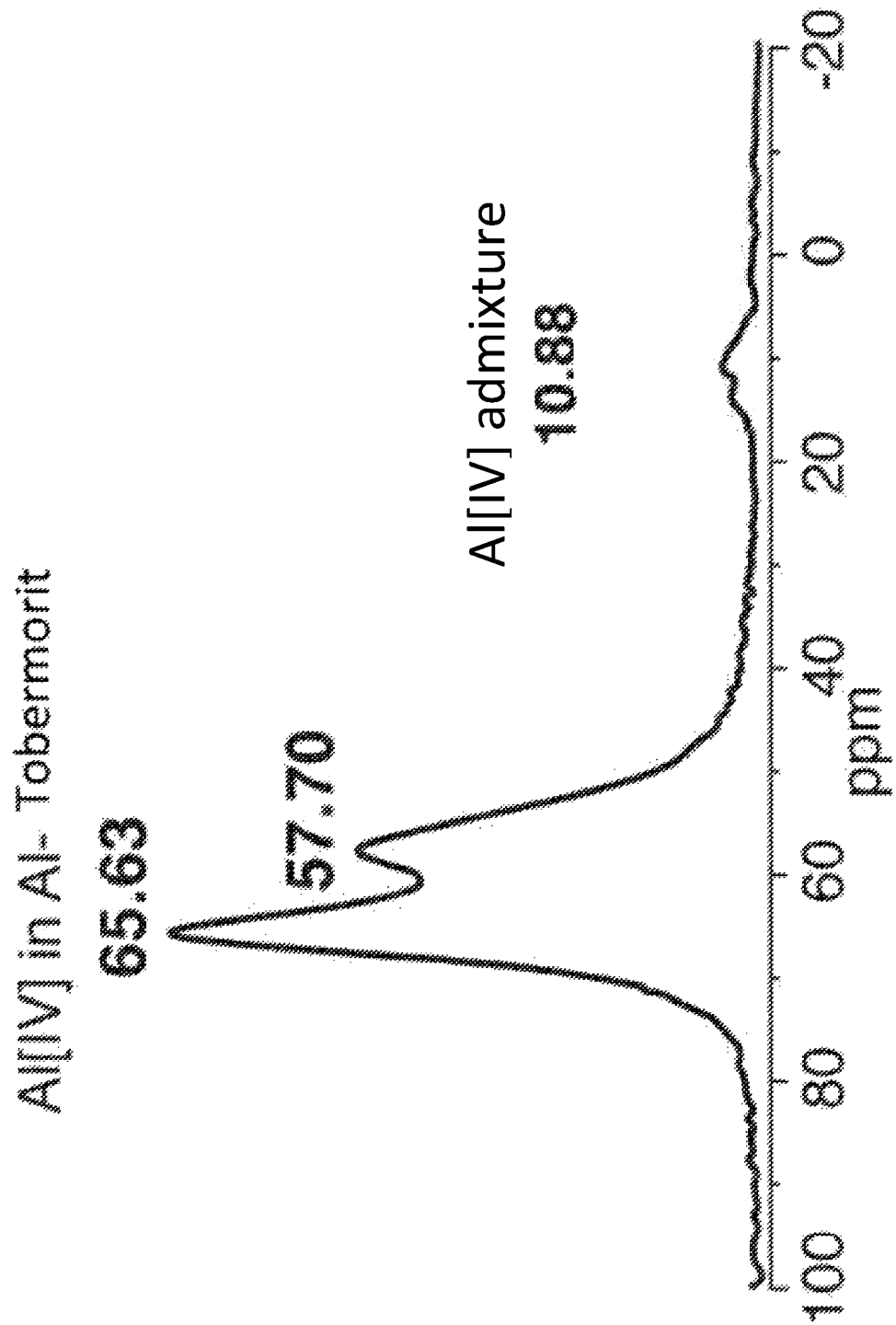
FIG. 11 $^{27}$Al-MAS-NMR spectrum of Roman concrete (state of the art).

The main peak at about 78 ppm is characteristic of calcium aluminate and is not found, for example, in the spectrum of tobermorite or in the spectrum of Roman concrete (see FIG. 11 from "Unlocking the secrets of Al-tobermorite in Roman seawater concrete" by Marie D. Jackson, Sejung R. Chae, Sean R. Mulcahy, Cagla Meral, Rae Taylor, Penghui Fi, Abdul-Hamid Emwas, Juhyuk Moon, Seyoon Yoon, Gabriele Vola, Hans-Rudolf Wenk, and Paulo J. M. Monteiro, Cement and Concrete Research, Volume 36, Issue 1, January 2006, Pages 18-29).

FIGS. 2-4 show that these three signals of the calcium aluminate with approximately the same chemical shifts in ppm can also be seen in the spectra of the material according to the invention, but with different intensities. A characteristic feature of the material according to the invention, as shown in the spectra of FIGS. 2 to 4, is that in addition to these signals of the starting material calcium aluminate, a new signal appears between the signal assigned to Al(IV) and the signal assigned to Al(V), even if this signal may not be seen as a separate peak due to superposition, but as a shoulder of the Al(IV) signal on the side of the higher field. The additional signal or the added shoulder in the Al spectrum is currently explained by the fact that in the material-forming reaction new bonds are formed from Al(IV) via oxygen to Si centers by the substitution of already existing Al(IV) centers; in view of this understanding, it is considered significant for the reaction presented that energy-rich Al(IV)—O—Al(IV) bonds are replaced (substituted) by lower-energy Al(IV)—O—Si bonds. This makes the reaction exothermic in the aggregate, and so it can proceed at room temperature.

The material according to the invention can thus be described as having the three peaks of calcium aluminate in an Al-MAS-NMR spectrum in the range 0-100 ppm (using $AlCl3-6H_2O$ as an external standard) and additionally a signal between the main peak and the peak nearest to the higher field, which signal can be present as a shoulder. The formation of new bonds naturally changes the relative peak heights compared to those in the spectrum of calcium aluminate.

The kinetics of the solid-state formation reaction were then investigated using IR spectra, showing the change over time in the IR absorption spectrum of a mixture of water glass and calcium aluminate activated with NaOH in accordance with the invention. To show this change, several spectra recorded during the course of the reaction are superimposed in the figures. The spectra recorded later have the stronger bands.

Figure 5A:
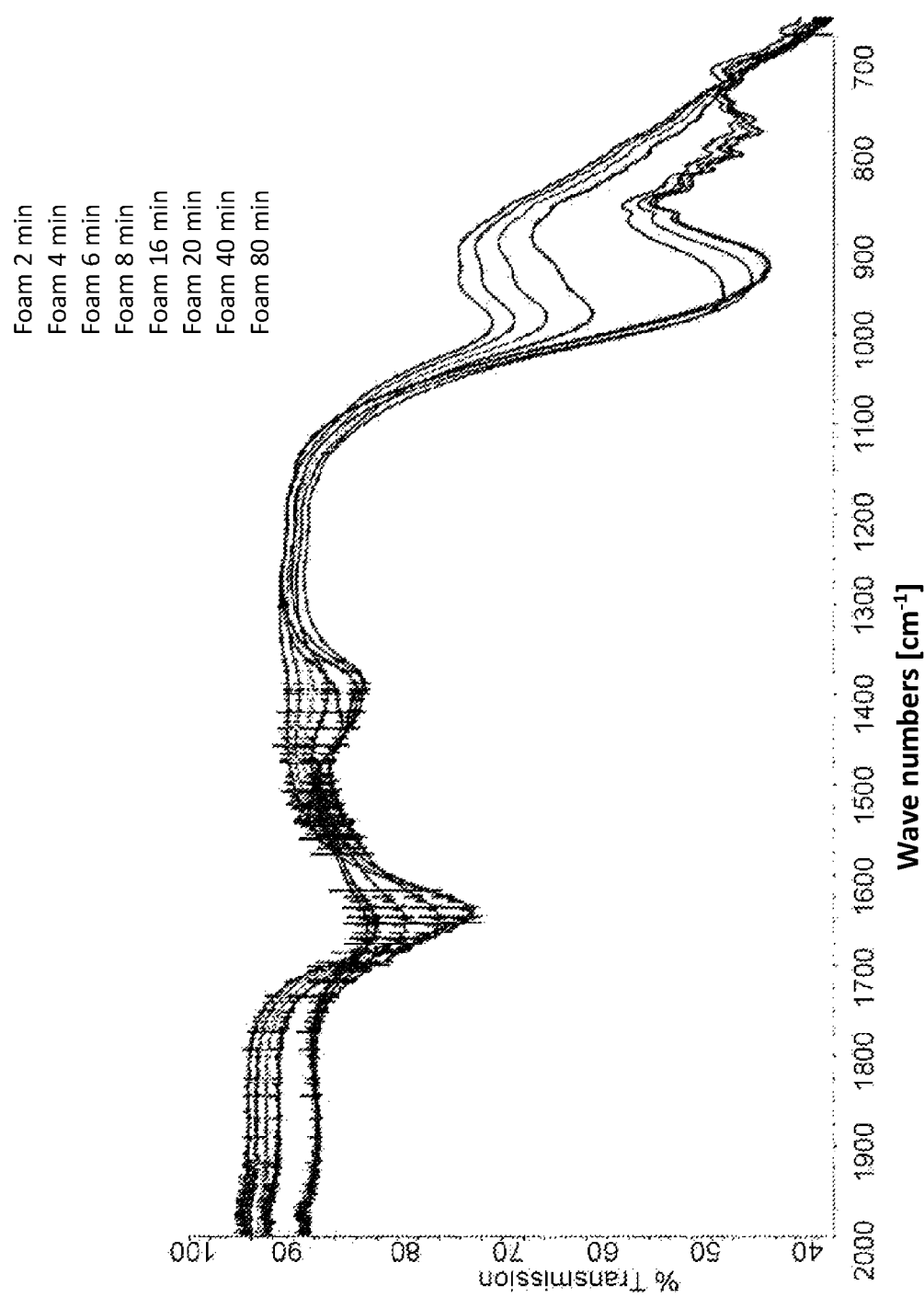
FIG. 5a shows the change of the IR spectra in transmission between 650 and 2000 $cm^{-1}$.
Figure 5B:
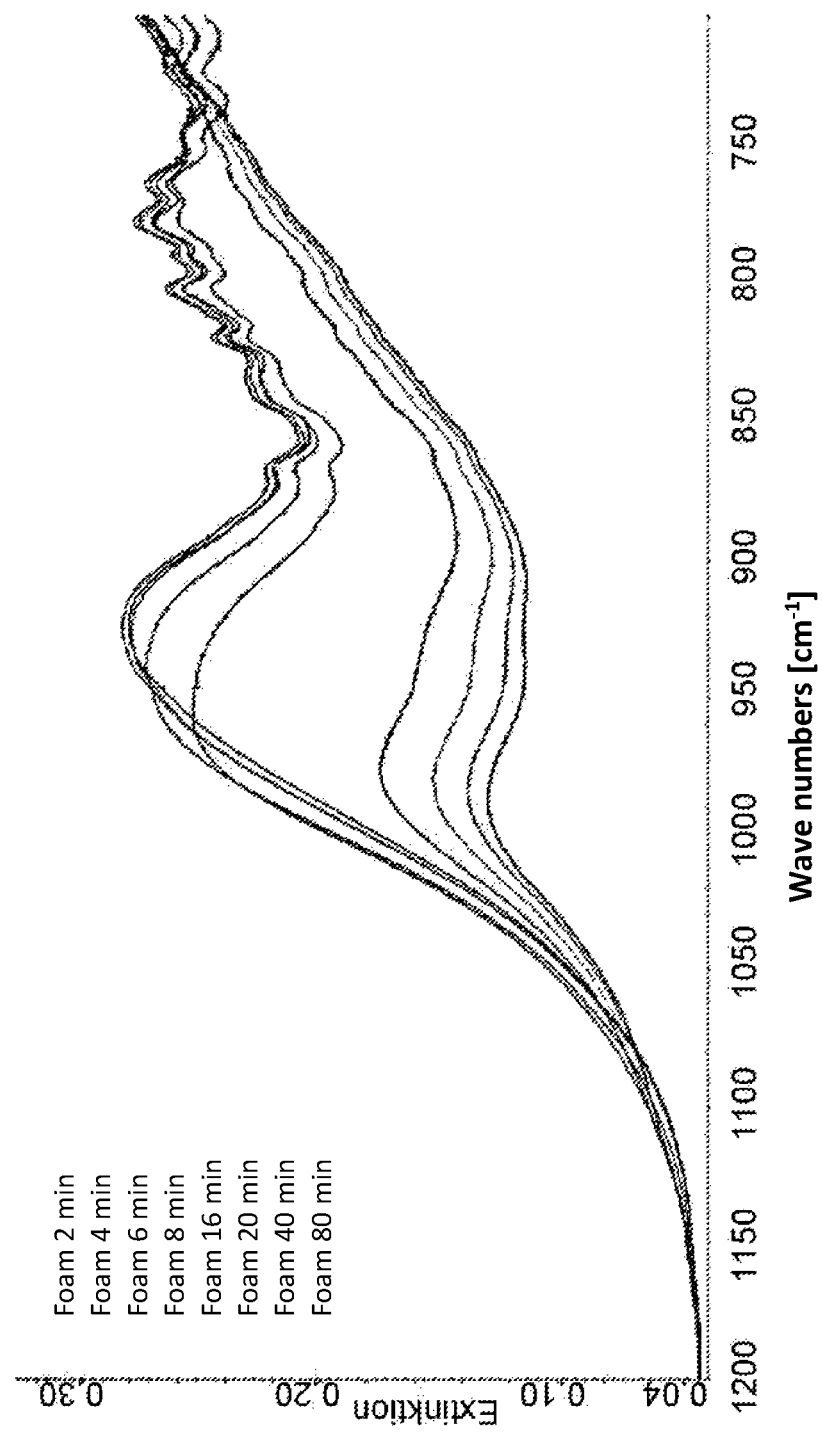
FIG. 5b shows the absorption between 650 and 1200 $cm^{-1}$. Absorptions above 1300 $cm^{-1}$ are caused by water. The transformation of a Si—O—Si bond into an Al—O—Si bond as the dominant bond associated with a shift from 995 to 920-960 $cm^{-1}$ is clearly visible.

FIG. 5a shows the change of the IR spectra in transmission between 650 and 2000 cm 1, FIG. 5b shows the absorption between 650 and 1200 $cm^{-1}$. Absorptions above 1300 cm 1 are caused by water. The transformation of a Si—O—Si bond into an Al—O—Si bond accompanying a shift from 995 to 920-960 $cm^{-1}$ as dominating the bond is well seen in FIGS. 5a and 5b. Accordingly, the IR spectrum of the solid material according to the invention shows a characteristic band around 960-910 $cm^{-1}$. It should be mentioned that conventional geopolymers vibrate at somewhat higher wave numbers between 960-1000 $cm^{-1}$. It should also be mentioned that in the IR spectrum two characteristic shifts of the water bands to about 1390 $cm^{-1}$ and to a signal between 2800 and 3000 $cm^{-1}$ can also be observed, compare also FIG. 5.

Aggregates of Different Grain Size

It was then investigated how aggregates of different grain size affect density and compressive strength.

Example 8A and B 102 g Na38/40, 10 g NaOH, 50 g water and 925 g coarse crushed stone were mixed with 165 g Secar® 71 (A) and 165 g Almatis® CA14 (B), respectively. Density: 2.27 $g/cm^3$ (A), compressive strength: 40.9 N/mm (A); density and compressive strength for (B) were comparable.

Example 9A and B 102 g Na38/40, 10 g NaOH, 18 g water were mixed with 325 g desert sand (120 pm particle size) and 180 g Secar® 71 (A) or 180 g Almatis® CA14 (B). Density: 2.01 $g/cm^3$ (A), compressive strength: 37.5 N/mm (A), flexural strength: 7.8 N/mm (A); density, compressive strength and flexural strength of (B) were comparable.

Carbon Dioxide Emissions

It was then computationally determined, for various specimens practically manufactured according to the invention, the reduction in $CO_2$ emissions that can be obtained in the manufacture of the material according to the invention compared to concrete.

The $CO_2$ emissions released during the production of concrete cannot be pushed below a fixed limit value, since about 2/3 of the $CO_2$ emissions released during the production of concrete are due to the conversion of the $CaCO_3$ to CaO. If the emission is calculated as 0.75 tons of $CO_2$ for each ton of cement produced, or 0.354 tons of $CO_2$ for one m of concrete of compressive strength 40 N/mm, the $CO_2$ emissions can be compared with those released when using the mixture according to the invention, provided that it is assumed that water glass, NaOH and, to a limited extent, calcium aluminate are also produced by using solar power generated without emissions.

The values given in the example formulations for the reduction of CO2 emissions now refer, on the one hand, to the $CO_2$ emissions from the production of currently available concrete of the specified quality and, on the other hand, to the $CO_2$ emissions from water glass, NaOH and calcium aluminate assuming exclusive use (100%) of solar electricity in the production of the required starting materials.

Example 10

6.4 g NaOH+86 g water glass Na38/40 with 36 g calcium aluminate (and 330 g construction sand) is solid after 90 min (final hardness: 41 $N/mm^2$). The Si/AG ratio is 1/1. (Proportionate CO2 emissions, based on concrete: 20%).

Example 11

14 g NaOH+86 g water glass Na38/40 with 50 g calcium aluminate (and 370 g construction sand) is solid after 180 min (final hardness: 30 $N/mm^2$). The Si/Al⁻ ratio is about 3/4 (5.7/8). (Proportionate $CO_2$ emissions, based on concrete: 24%)

Example 12

14 g NaOH+86 g water glass Na38/40 with 50 g water and 35 g calcium aluminate (and 680 g construction sand) is solid after 24 h (final hardness: 11 N/mm$^2$). The Si/Al-ratio is 1/1. (Proportion of $CO_2$ emissions, based on concrete: 11%).

Figure 6:
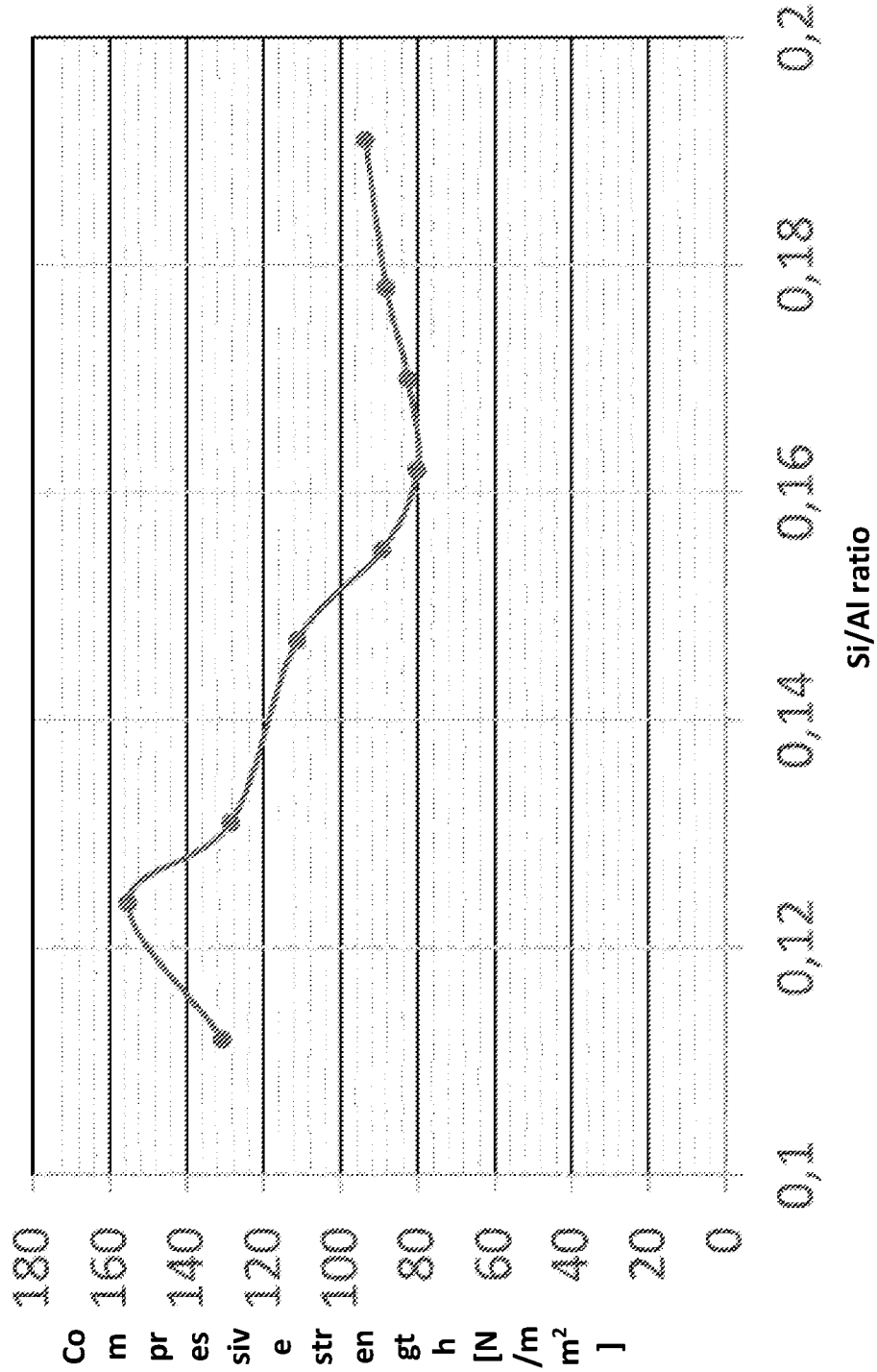
FIG. 6 Compressive strengths obtained for different Si/Al ratios (reaction with sodium silicate, NaOH, calcium aluminate and different amounts of quartz flour to achieve identical initial viscosities of the reaction mixture).
Figure 7:
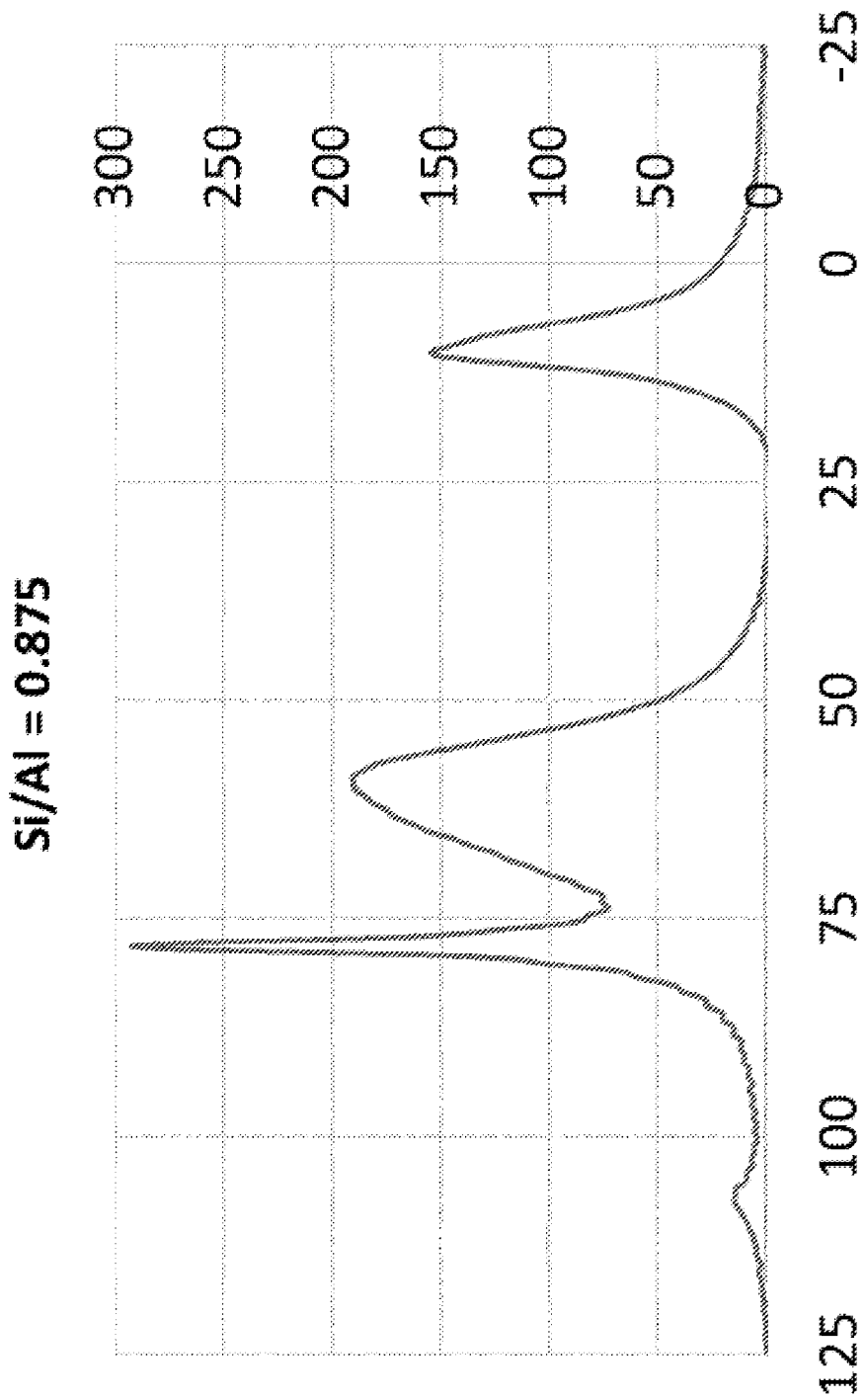
FIG. 7 $^{27}$A-MAS-NMR spectrum (Si—Al ratio 0.875) with the maximum of the bond peak at 59.3 ppm and in the IR at 943 $cm^{-1}$.
Figure 8:
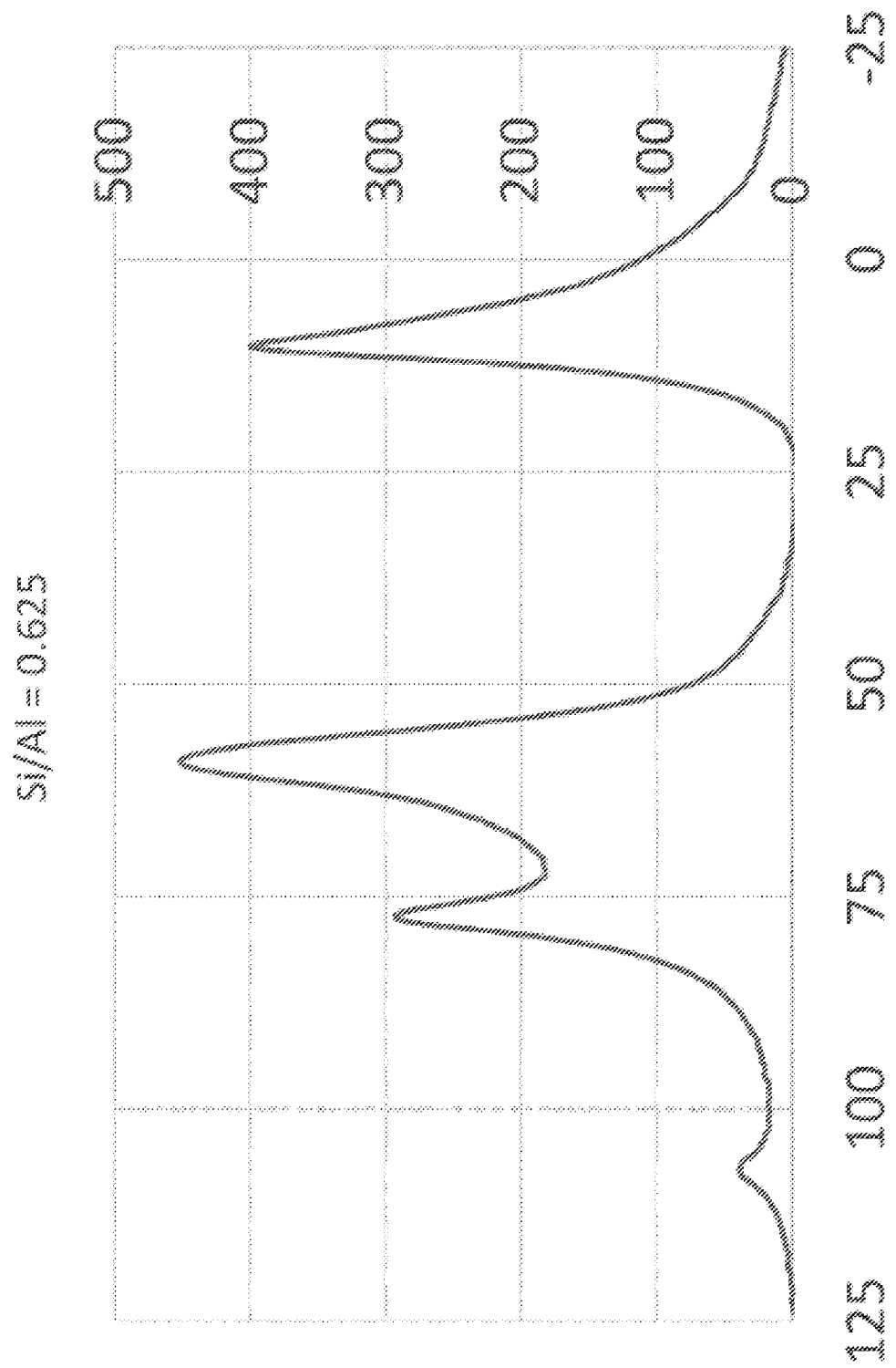
FIG. 8 $^{27}$A-MAS-NMR spectrum (Si—Al ratio 0.625) with the maximum of the bond peak at 59.1 ppm and in the IR at 940 $cm^{-1}$.
Figure 9:
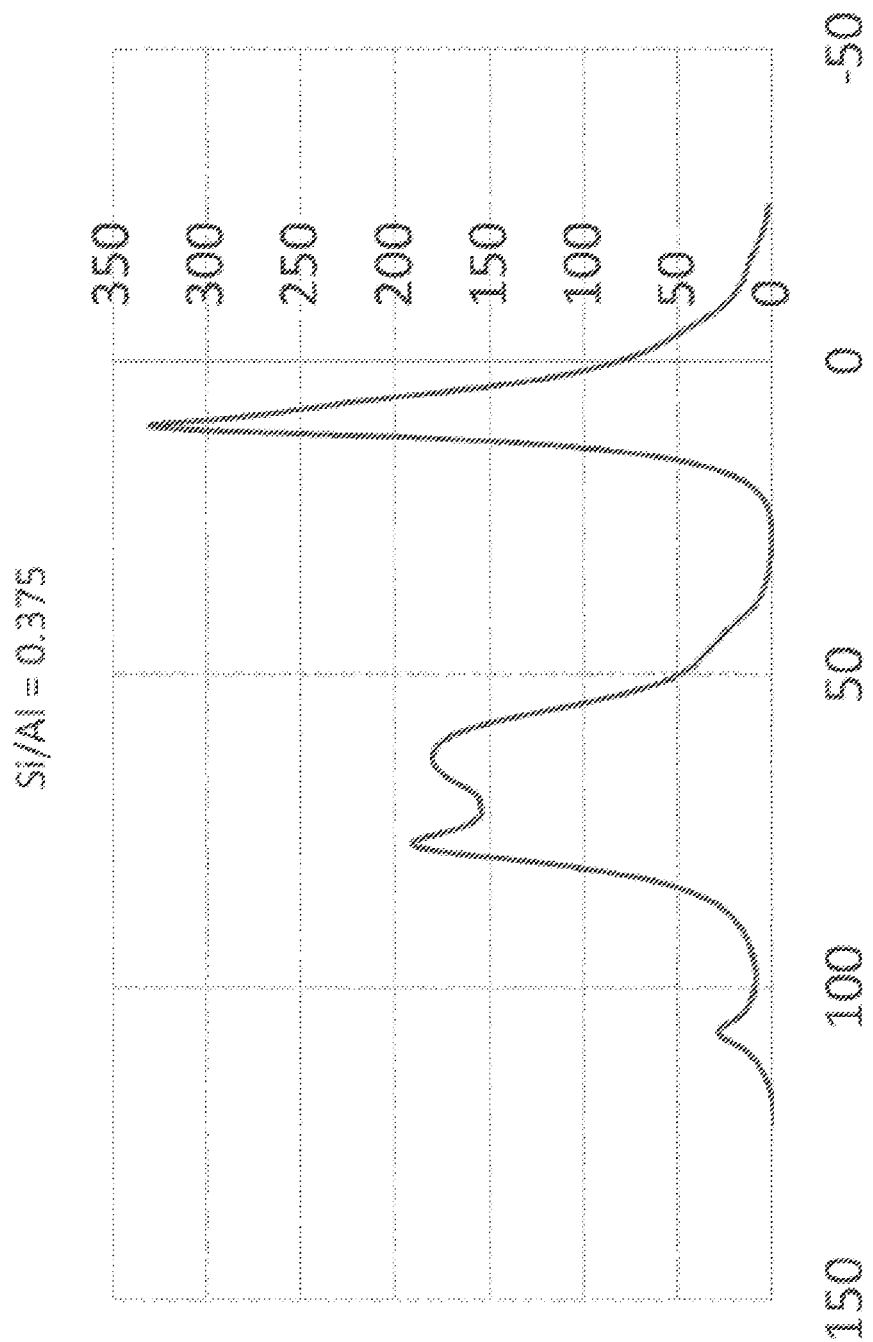
FIG. 9 $^{27}$Al-MAS-NMR spectrum (Si—Al ratio 0.375) with the maximum of the bond peak at 63.4 ppm and in the IR at 943 $cm^{-1}$.
Figure 10:
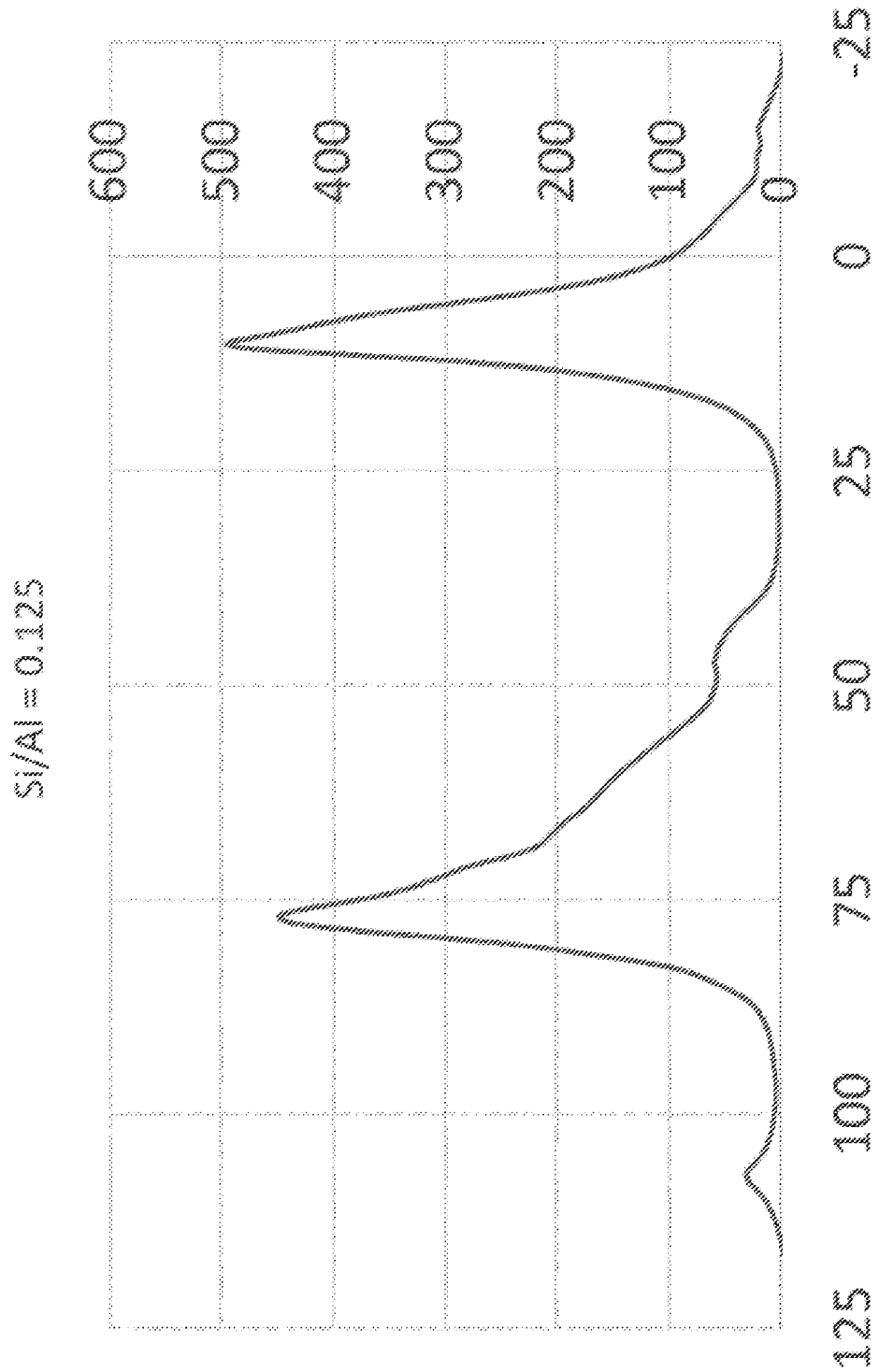
FIG. 10 $^{27}$Al-MAS-NMR spectrum (Si—Al-ratio 0.125) with the maximum of the binding peak at 65.0 ppm and in IR at 952 cm$^{-1}$.

Example 13 (Maximum Value from FIG. 6)

30 g NaOH+32 g water glass Na38/40 and 68 g water glass Na48/50 with 70 g water and 370 g calcium aluminate (and 31 g quartz flour) is solid after 12 min (final hardness: 155 N/mm$_2$). The Si/Al-ratio is 1/8 (proportional C02 emissions, based on concrete: 100%).

In the last example in particular, it should be noted that a very high final strength was achieved and that quartz powder, i.e., a very fine aggregate, was incorporated, which typically leads to a considerable mixing energy requirement for high-performance concrete, which was not taken into account comprehensively and correctly in the lump-sum considerations. This means that considerable amounts of $CO_2$ can be saved overall.

Lipophilization

It was then investigated by using different functionalizing silanes how the material can be functionalized.

For this purpose, water glass, sodium hydroxide and calcium aluminate and the required amounts of water were brought into contact together with the different functionalized silanes during the preparation of the solids, and the solids obtained were then subjected to a search.

It was found that the lipophilic compound octyl triethoxysilane lipophilizes the entire batch when added to the binder in a range of 0.5-3%. This makes not only the surface water repellent, but the whole stone. It is therefore possible to grind or drill without the stone losing its water-repellent properties in the corresponding areas.

Even when the water glasses Rhodarsil R51T (tripotassium methylsilane triolate, a methyl siliconate) or Protektosil WS 808 (tripotassium propylsilane triolate, a propyl silicate) were added between a few % and 100% as a water glass substitute, a continuous lipophilization of the stones was achieved.

Silicon Nanoparticles as Si Tetrahedral Source

It was then investigated whether the material according to the invention could also be produced without water glass.

In order to show that a material according to the invention can also be produced without water glass, $SiO_2$ nanoparticles (here: Köstrosol 1540) were recombined with calcium aluminate instead of water glass. In this case, 10 g of Köstrosol mixed with 3 g of NaOH and 20 g of calcium aluminate solidified within 3 min. $SiO_2$ nanoparticles can thus readily act as a Si tetrahedral source.

Mixtures for Rapid Curing

Various mixtures were used to investigate how the curing time can be shortened.

- 100 g K42 (Betolin K42 from Woellner), 20 g KOH, 50 g water with 55 g water and 420 g calcium aluminate. The mixture is solid after 90 sec, with a compressive strength of 123 N/mm$^2$.
- 100 g K35 (Betolin K35 from Woellner), 20 g KOH, 50 g water with 55 g water and 425 g calcium aluminate, solid after 8 min, with a compressive strength of 169 N/mm$^2$.
- Si/Al ratio 0.33: 100 g Na38/40 (Betol 38/40 from Woellner), 10 g NaOH, 10 g water, 250 g calcium aluminate, 125 g desert sand, solid after 12 min, with a compressive strength of 162 N/mm$^2$.

It should be emphasized that compounds with such rapid curing are already very suitable for 3D printing.

Aggregates

Various additives were added to formulations as described in Examples 1-13 in order to check whether a good material bond was obtained.

In this way, it could be confirmed that a good material bond of the compounds with the following aggregates is obtained: is obtained: Alumina, quartz flour, blue quartz flour, titanium dioxide, metakaolin, polyfill, Ceratec, Granoflour tubular gray, Granoflour yellow, concrete recycling material, fine rubber granules, coal, barium sulfate, concrete gravel, red clay gravel, mica, talc, fireclay, corundum, microsilica, poraver in various grain sizes, namely 0.06-0.125; 0.25-0.5; 0.5-1.0; 1,0-2.0; liaver in various grains, namely 0.25-0.5; 0.5-1.0; 1,0-2.0; 2,0-4.0; wood chips; Gutex wood fiber; wood chips, expanded clay; Aeroballs; Aeropor 180; Aeroballs 0.5-0,7, Nabalox, Alfa Tab 0-0.5045; Alfa Tab 0-0.6; wollastonite Tremin 263-100, Lumiten 3108, and various types of sand, namely ultrafine sand, recycled sand 0-2 mm; desert sand from China, Dubai, Oman, Jordan and Tunisia, quartz sand from Krauchenwies in the Swabian Alb and unsifted sand from a Portuguese sand beach. Stable solids could be produced with all these materials, and these solids are sufficiently abrasion resistant for applications to be anticipated without further ado.

It was examined whether the various aggregates interfere with each other or whether the material according to the invention can be used to produce a good bond. To this end, layers of material with one aggregate were cured in a mold and then further layers of material with different aggregates were cured on top to determine whether a stable material bond was produced. Thus, a first "sandwich" was created with material layers containing desert sand, aluminum hydroxide and brick recycling material, as well as another "sandwich" whose material layers included liaver, wood or concrete gravel as aggregates. These material layers proved to be stable, i.e., no separation failure occurred at the layer boundaries.

As far as mineral aggregates are concerned, it was then investigated whether segregation occurs before curing when using aggregates with very different grain sizes. For this purpose, a formulation was used which had a long curing time of more than 60 minutes for the material according to the invention. Such a mixture was mixed with mineral aggregates of different grain size, poured into a column mold and placed with the mold on a vibrating table to investigate whether prolonged vibrating could provoke segregation. It was found that no segregation occurred despite the prolonged shaking.

Moreover, as far as wood as an aggregate is concerned, wood chips of different wood types were combined with one and the same material mixture resulting in the material according to the invention to form a wood chipboard. In this way, stable chipboard could be produced without the need for heating under pressure. The material mixture yielding the material according to the invention was thus used as a binder. Wood chips from both hardwood and softwood species were used for various samples in order to check whether one and the same material according to the invention is in principle suitable for bonding different wood chips together, which was confirmed. No differences were found when using the same binder for different types of wood.

In order to test the fire resistance, particle boards produced with the material of the invention were then flamed with a Bunsen burner. For this purpose, a water glass mixture of 102 g K35, 10 g H₂O, 12 g KOH was prepared and 74 g of this mixture was mixed with 100 g calcium aluminate and 60 g wood fiber as well as 9.4 g R51T and cured in board form. It was found that after a flame treatment time, at which conventionally produced wood particle boards were already in flames, no damage was observed on the wood particle boards produced with the material according to the invention.

Maximum Compressive Strengths

It was then investigated how, for given starting materials, the compressive strength can be influenced by varying the Si/Al⁻ ratio.

After initially establishing that particularly high compressive strengths are obtained when the Si/Al ratio is particularly small, whereas only lower compressive strengths can be obtained when the Si/Al becomes larger, i.e., less aluminum is used in relation to the silicon, the compressive strength was investigated for particularly low Si/Al ratios. By varying the mixing ratios of a material-forming compound according to the invention, it was possible to plot the compressive strength curve in FIG. 6. This shows that, if the Si/Al ratio is too low, the compressive strength decreases as before, so that the use of the expensive calcium aluminate in excess does not result in any advantages in terms of mechanical stability.

Spectra of the Material—II

The effect of varying the Si/Al⁻ ratio on the $^{27}$A-MAS NMR was then investigated. For this purpose, samples of the material according to the invention were again prepared with different mixing ratios of a material-forming mixture according to the invention in such a way that samples with the desired Si/Al⁻ ratio were obtained.

Table 1 lists the amounts of NaOH, water glass Na38/40 and calcium aluminate used to produce the samples with the desired Si/Al⁻ ratios. Furthermore, except for waiting times and compressive strength after five and 21 days, respectively, data for these specimens are tabulated in Table 1:

TABLE 1

Data of different mix designs with curing times and compressive strengths, measured after 5 and 21 days, respectively.

| Si/Al | NaOH | Na38/40 | Ca-aluminate | Curing time | N/mm² |
|---|---|---|---|---|---|
| 0.125 | 14.2 g | 86 g | 286 g | 5 min | 57 (5 days) |
| 0.156 | 20.0 g | 100 g + 10 g H₂O | 268 g | 17 min | 77 (21 days) |
| 0.231 | 10.0 g | 100 g + 10 g H₂O | 180 g | 20 min | 60 (21 days) |
| 0.375 | 14.2 g | 86 g | 96 g | 100 min | 75 (5 days) |
| 0.625 | 14.2 g | 86 g | 58 g | 140 min | 32 (5 days) |
| 0.875 | 9.1 g | 91 g | 44 g | 50 min | 47 (5 days) |

The $^{27}$Al-MAS NMR spectra recorded on these samples are shown in FIGS. 7-10. Note the slightly different scaling of the X-axis in some cases.

These spectra show that the new binder or the novel solid-state material can not only be identified per se by $^{27}$A-MAS-NMR, but furthermore that further relevant information can be obtained from the spectrum. Important conclusions can be drawn from the strengths of the signals at the respective peaks or from the area values of the signals by comparing the strengths or area values of different signals.

Thus, the ratio of the area value of the signal at 65 ppm, i.e., the actual bond signal from the —O—Si—O—Al—O bonds, to the area value of the signal at 78 ppm, i.e., the signal from the —O—Al—O— bonds, runs from 0—if only —O—Al—O bonds are present in the calcium aluminate—to over 10. The value in the upper signal ratio range close to 10 is limited by the detectability of the signal at 78 ppm, because for Si/Al ratios close to 1 the signal at 78 ppm will be very small and possibly even close to zero, because the calcium aluminate will react off almost completely at this Si/Al ratio. However, NMR instruments today are generally very good. It is therefore possible with today's NMR instruments to set a noise ratio of 3s (sigma) as the detection limit for the 78 ppm signal, and despite this sharp criterion for clear detectability of the 78 ppm signal in a material according to the invention even if, even if it was generated with a ratio of Si/Al almost equal to 1, at which practically all calcium aluminate should have been reacted, still unreacted calcium aluminate should be found in an amount sufficient for spectral recognition, for example in insufficiently mixed regions.

With this in mind, the peak areas for the three signals to be attributed to the calcium aluminate and for the additional signal were determined. If the peak area of the individual signals is normalized to the total area in the spectrum, values are obtained as listed in Table 2. Per se, the considered signals of the calcium aluminate at the values 78 ppm, 47.2 ppm and 11 ppm together with the additional signal should account for 100% of the total area; however, the peak area values deviate from this somewhat in some cases, which can be attributed to effects such as noise, inaccuracies in the calculation due to the superposition of curves, etc. Nevertheless, it is clear that the signal component of the signal around 65 ppm increases significantly with the Si/Al ratio. It should be noted that the signal at 47.2 ppm, which can be attributed to a five-coordinate aluminum, plays no role in the reaction.

TABLE 2

Peak area values in percent of each of the $^{27}$Al signals

| | Signal at | | | | |
|---|---|---|---|---|---|
| Si/Al | 78 ppm | 65 ppm | 47.2 ppm | 11 ppm | 65 ppm/78 ppm |
| 0 | 80.8% | 0.0% | 6.7% | 12.5% | 0 |
| 0.125 | 40.1% | 17.6% | 3.1% | 39.2% | 0.4 |
| 0.156 | 25.1% | 30.6% | 3.1% | 34.5% | 1.2 |
| 0.231 | 21.6% | 38.8% | 3.1% | 36.5% | 1.8 |
| 0.375 | 7.40% | 49.5% | 3.1% | 40.0% | 6.7 |
| 0.625 | 7.58% | 56.2% | 3.1% | 33.1% | 7.4 |
| 0.875 | 11.7% | 62.0% | 3.1% | 23.2% | 5.3 |

In a corresponding manner, the peak heights of the individual signals in the Al-MAS NMR can be determined instead of the area values. The corresponding, relative signal heights are listed in Tab. 3, again using relative normalization. Again, the signal at 47.2 ppm, which can be assigned to a fivefold coordinated aluminum, plays no role in the reaction.

TABLE 3

Peak height values (in percent) of the individual $^{27}$Al signals

| Si/Al | Signal at | | | | |
|---|---|---|---|---|---|
| | 78 ppm | 65 ppm | 47.2 ppm | 11 ppm | 65 ppm/78 ppm |
| 0 | 80.8% | 0.0% | 6.7% | 12.5% | 0 |
| 0.125 | 40.0% | 12.5% | 3.5% | 44.0% | 0.31 |
| 0.156 | 33.9% | 25.5% | 3.5% | 37.1% | 0.75 |
| 0.231 | 40.6% | 19.8% | 3.5% | 36.1% | 0.49 |
| 0.375 | 15.5% | 26.8% | 3.5% | 54.2% | 1.7 |
| 0.625 | 16.8% | 40.4% | 3.5% | 39.3% | 2.4 |
| 0.875 | 35.3% | 38.6% | 3.5% | 22.6% | 1.1 |

Exemplary Compositions at Range Limits

Mixtures were then defined against the background of the experiments which lead to the formation of material with very large or very small Si/Al ratios; for comparison, a reaction mixture was also defined which gives a material with intermediate Si/Al ratios. These mixtures are intended to indicate only exemplary reaction mixtures for the range limits, without being self-limiting. As an example, the reaction mixtures of Table 4 are suggested. As far as a mixture to obtain a material just below the Si/Al ratio of 12:12 is concerned, the calcium aluminate content will then be slightly lowered and the water glass content slightly increased.

TABLE 4

Limits of the range of the test results

| Si/Al ratio | 1:12 | 8:12 | 12:12 |
|---|---|---|---|
| Calcium aluminate | 70.2% | 35.0% | 26.3% |
| Water glass (solid) | 5.10% | 19.9% | 22.0% |
| NaOH (solid) | 2.34% | 9.10% | 4.70% |
| Water | 22.4% | 36.0% | 47.0% |

The inert content can be up to 80%. The above weight-percentage ratios thus drop to a maximum of 1/5 of the above values when related to the weight of a building element provided with aggregates. The proportion of calcium aluminate in the total massecuite required for the production of building elements of a given mass thus does not fall below the value of 5.26%, even for such a high inert material content.

With regard to KOH and potassium silicate, the values for caustic soda and water glass are at most a factor of 56/40=1.4 above those of sodium hydroxide solution and sodium silicate. The inert material content can be increased up to 80%. The percentage ratios listed above thus drop to a maximum of 1/5 of the above values. Thus, the calcium aluminate content of no mixture falls below the value of 5.26%.

Thus, described above, among others, but not exclusively, was a mixture containing Si, Al, Ca, O and at least one of Na and K, which in the $^{27}$A-MAS-NMR spectrum exhibits in addition to the $^{27}$A-MAS-NMR spectrum of calcium aluminate a signal with a chemical shift which lies between that of the main peak of calcium aluminate and that peak of calcium aluminate which is closest to the main peak in the higher field. The solid can be used, among other things, as a construction material with aggregates, as a coating, as an adhesive for bonding second construction elements, for sanitary ceramic elements, for high-temperature applications, for repairing existing structures, especially for underwater repair, for the construction and/or repair of structures, especially when high compressive strengths are required or chemically aggressive conditions occur. It can be produced by contacting water glass, sodium and/or potassium hydroxide, calcium aluminate, one or more aggregates and, if necessary, additionally water, in particular seawater, even at temperatures below 0° C. without heating.

What is claimed is:

1. A solid formed with Si, Al, Ca, O and at least one of Na and K,
    wherein in comparing the $^{27}$Al-MAS-NMR spectrum of the solid to the $^{27}$Al-MAS-NMR spectrum of calcium aluminate, an additional signal is present in the $^{27}$Al-MAS-NMR spectrum of the solid, wherein the additional signal has a chemical shift which lies between that of the main peak of calcium aluminate and that peak of calcium aluminate which is closest to the main peak in the higher field,
    wherein on the basis of the signal areas of the three signals attributed to calcium aluminate signal and the additional signal in the $^{27}$Al-MAS-NMR spectrum of the solid, the Si/Al-ratio is determined to be less than 1 and greater than 0.1,
    wherein a calcium aluminate signal is also present in the $^{27}$Al-MAS NMR spectrum of the solid, at a chemical shift around 78 ppm, the calcium aluminate signal being at least 3σ (sigma) above the noise,
    wherein the $^{27}$Al-MAS-NMR spectrum of the solid has the additional signal and a calcium aluminate signal at a chemical shift around 78 ppm, and
    wherein said solid is hydrophobic throughout the volume.

2. The solid of claim 1, wherein the chemical shift of the additional signal is between 67 ppm and 57 ppm.

3. The solid of claim 1, wherein the additional signal is at least 3σ (sigma) above the noise.

4. The solid of claim 1, having a band at about 960-920 cm$^{-1}$ in an IR spectrum.

* * * * *